United States Patent
Ross et al.

(10) Patent No.: US 6,314,513 B1
(45) Date of Patent: Nov. 6, 2001

(54) METHOD AND APPARATUS FOR TRANSFERRING DATA BETWEEN A REGISTER STACK AND A MEMORY RESOURCE

(75) Inventors: Jonathon K. Ross, Sunnyvale; Cary A. Coutant, Saratoga; Carol L. Thompson, San Jose; Achmed R. Zahir, Menlo Park, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/199,003

(22) Filed: Nov. 23, 1998

Related U.S. Application Data

(63) Continuation-in-part of application No. 09/064,091, filed on Apr. 21, 1998, now Pat. No. 6,065,114, and a continuation-in-part of application No. 08/940,834, filed on Sep. 30, 1997.

(51) Int. Cl.[7] .................................................. G06F 13/00
(52) U.S. Cl. .......................................... 712/228; 711/159
(58) Field of Search .................................. 712/228, 225; 711/159, 165

(56) References Cited

U.S. PATENT DOCUMENTS

| | | | |
|---|---|---|---|
| 3,810,117 | 5/1974 | Healey | 340/172 |
| 4,325,120 | * 4/1982 | Colley | 711/202 |
| 5,327,566 | 7/1994 | Forsyth | 395/775 |
| 5,398,330 | 3/1995 | Johnson | 395/575 |
| 5,428,779 | 6/1995 | Allegrucci et al. | 395/650 |
| 5,530,870 | 6/1996 | De Bruler | 717/6 |
| 5,535,397 | 7/1996 | Durante et al. | 395/740 |
| 5,564,031 | 10/1996 | Amerson et al. | 395/419 |
| 5,628,016 | 5/1997 | Kukol | 717/4 |
| 5,640,582 | * 6/1997 | Hays | 712/38 |
| 5,659,703 | * 8/1997 | Moore | 711/109 |
| 5,706,466 | * 1/1998 | Dockser | 711/125 |
| 5,761,467 | * 6/1998 | Ando | 712/200 |

OTHER PUBLICATIONS

"RISC systems", *Microprocessors and Microsystems*, Daniel Tabak, vol. 12, No. 4, May 1988, pp. 179–185.
"A Simple Interprocedural Register Allocation Algorithm and Its Effectiveness for LISP", *amc Transactions on Programming Languages and Systems*, Peter A. Steenkiste and John L. Hennessy, vol. 11, No. 1, Jan. 1989, pp. 1–32.
"A VLSI RISC", *Computer*, David A. Patterson and Carol H. Sequin, vol. 15, No. 9, Sep. 1982, pp. 1–21.
"Chapter 8, Stack Unwind Library", *The 32–bit PA–RISC Run–Time Architecture Document*, Hewlett–Packard Company, HP–UX 10.20 version 3.0, 1985–1997.
"Chapter 7, Stack Unwinding", Hewlett Packard *PA–RISC Procedure Calling Conventions* (Reference Manual), 1986.
"Stack Unwinding and Exception Handling", *64–bit Runtime Architecture for PA–RISC 2.0*, Version 2.2, Oct. 6, 1997, pp. 21–26.

* cited by examiner

Primary Examiner—Eric Coleman
(74) Attorney, Agent, or Firm—Blakely, Sokoloff, Taylor & Zafman LLP

(57) ABSTRACT

A computer-implemented method and apparatus for transferring the contents of a general register, in a register stack, to a location in a backing store in a main memory are described. When transferring the contents of a general register to a location in the backing store, the invention proposes collecting attribute bits included in each general register of a predetermined group of registers in a temporary collection register. Once the temporary collection register has been filled, the contents of this register are written to the next available location in the backing store. Similarly, on the restoration of registers from the backing store, a collection of attribute bits saved in the backing register is transferred to a temporary collection register. Thereafter, each attribute bit is saved together with associated data into a general register, thereby to restore the former contents of each general register.

45 Claims, 18 Drawing Sheets

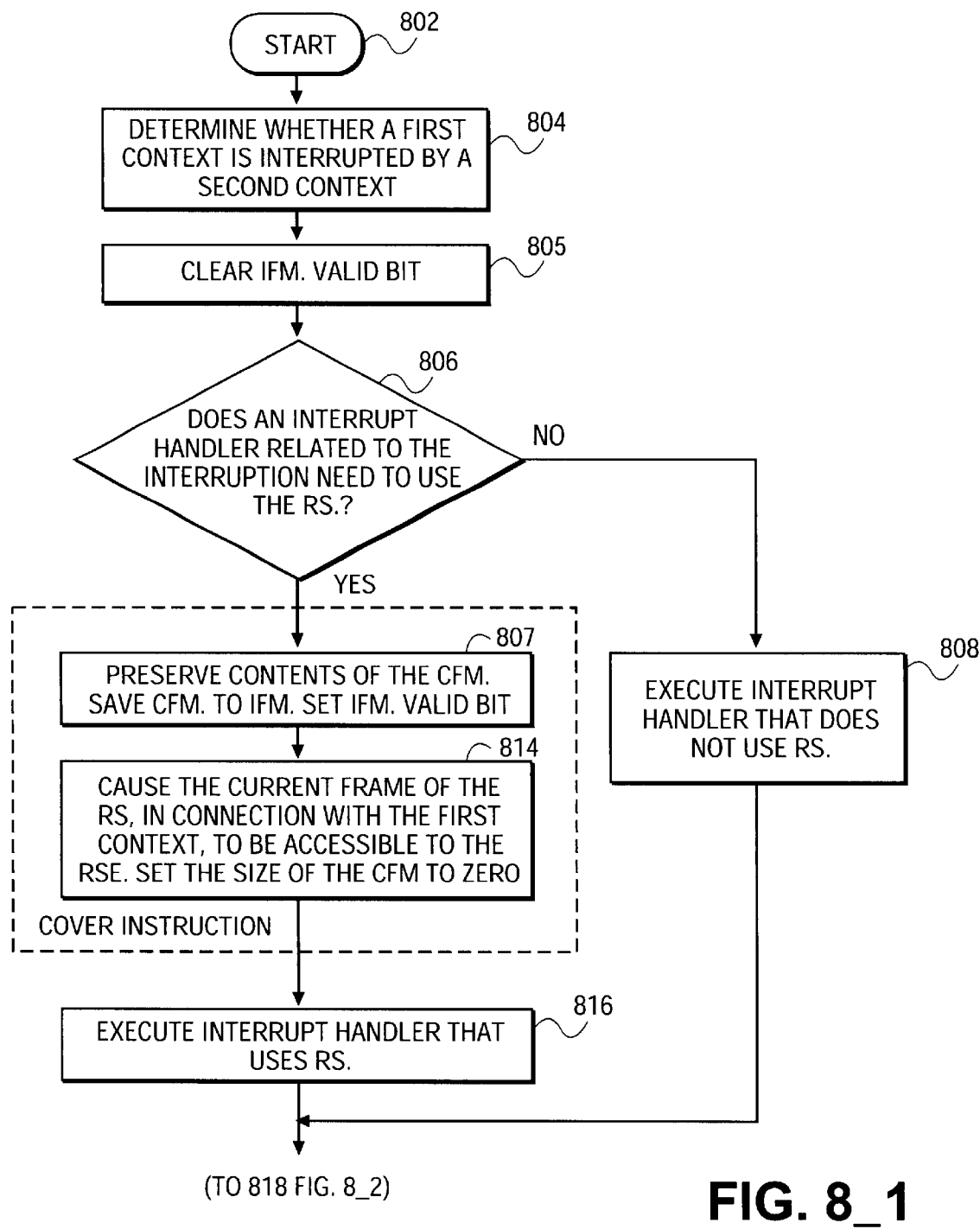
FIG. 8_1

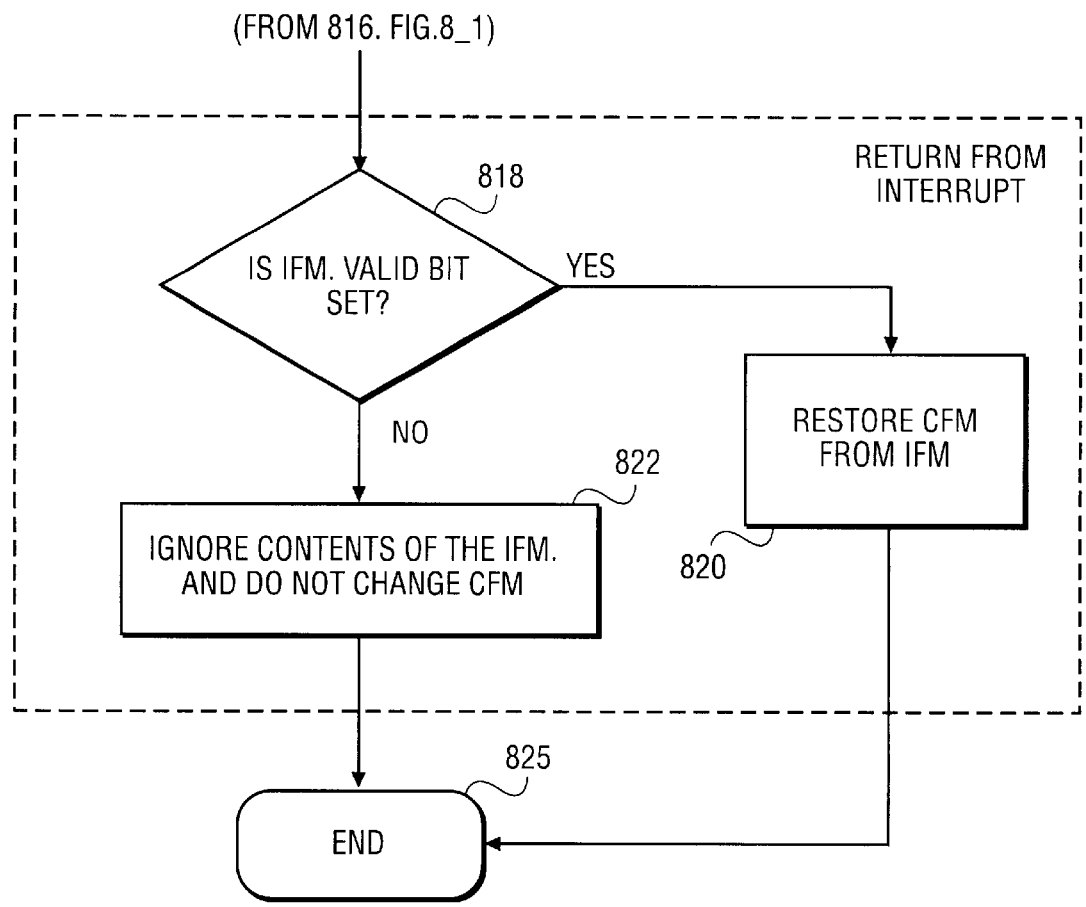
FIG. 8_2

METHOD AND APPARATUS FOR TRANSFERRING DATA BETWEEN A REGISTER STACK AND A MEMORY RESOURCE

This is a continuation-in-part of applications Ser. No. 08/940,834, filed Sep. 30, 1997, and Ser. No. 09/064,091, filed Apr. 21, 1998, now U.S. Pat. No. 6,065,114.

FIELD OF THE INVENTION

The present invention relates generally to the architectural state of a microprocessor. Specifically, the present invention relates to a method and apparatus for transferring data between a register stack and a backing store defined in the memory associated with the microprocessor.

BACKGROUND OF THE INVENTION

A register stack may comprise a number of general registers of a microprocessor, which have been designated for the storage of data required by, and pertaining to, procedures of a stored program being executed by the microprocessor. Specifically, upon execution of a particular procedure, a stack frame associated with that procedure is created within the register stack. The stack frame includes saved registers (containing variables local to relevant procedure), an activation record and a frame marker. When a procedure calls a further procedure, the called procedure in turn creates a further stacked frame on top of the stacked frame for the calling procedure. Accordingly, for a program in which a number of nested procedures are being executed, the register stack may include a corresponding number of stack frames.

A register stack accordingly allows multiple procedures to effectively share a large register file by stacking associated stack frames in both on-chip registers and off-chip memory. The call/return patterns of typical programs exhibit high call/return frequencies with small amplitudes. A register stack significantly reduces the number of stores (i.e., register saves) at procedures calls and loads (i.e., register restores) at procedure returns, and thus provide a "cache" of information pertinent to nested procedures. As processor operating frequencies are increasing faster than the access times to memory resources (e.g., RAM) are decreasing, reducing the number of memory accesses performed by a program, as a result of procedure calls and returns, provides a performance advantage. This advantage is becoming increasingly significant in view of the popularity of modular and object-oriented programming, and the use of dynamically linked libraries.

As a register stack has a limited size, it will be appreciated that in a deeply nested procedure call sequence, the capacity of the register stack may be exceeded in what is termed a "spill". In such situations, it is necessary to transfer some of the registers of previous stack frames from the register stack to a backing store in order to create capacity within the register stack. Similarly, as the register stack empties on procedure returns, it is desirable to restore registers of previous stack frames that have been stored in the backing store to the register stack. The transfer of stack frames between the register stack and the backing store may be problematic where the number of bits contained in a register of the register stack is not a multiple of the addressing scheme employed to address the memory resource where the backing store resides.

SUMMARY OF THE INVENTION

According to the invention there is provided a method of transferring data between a register and a memory resource.

A first portion of data stored in a first register is transferred to a first location. A second portion of the data stored in the first register is transferred to a second location. A determination is made as to whether the second location contains a predetermined quantity of stored data. If so, then the stored data of the second location is transferred from the second location to a third location.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIGS. 8_1 and 8_2 illustrate a flow chart diagram in connection with process for switching contexts triggered by a COVER instruction.

DETAILED DESCRIPTION

Embodiments of methods and apparati for transferring data between a register and a memory resource within an integrated circuit are described. In the following description, for purposes of explanation, numerous specific details are set forth in order to provide a thorough understanding of the present invention. It will be evident, however, to one skilled in the art that the present invention may be practiced without these specific details.

Register Stack and Register Stack Engine

While the present invention is described within the context of a microprocessor, it will be appreciated that the teachings of the present invention may be applicable to any machine that is capable of executing a predetermined set of steps (e.g., as specified by a set of instructions comprising a computer program or internally generated micro-code), and that includes a register for storing data pertaining to the execution of the predetermined set of steps. Accordingly, the present invention may find application in, merely for example, microprocessors (e.g., the Pentium II® microprocessor manufactured by Intel Corp. of Santa Clara, Calif.), microcontrollers (embedded or otherwise), Digital Signal Processors (DSPs), graphic and video processors, or network processors.

Figure 1:
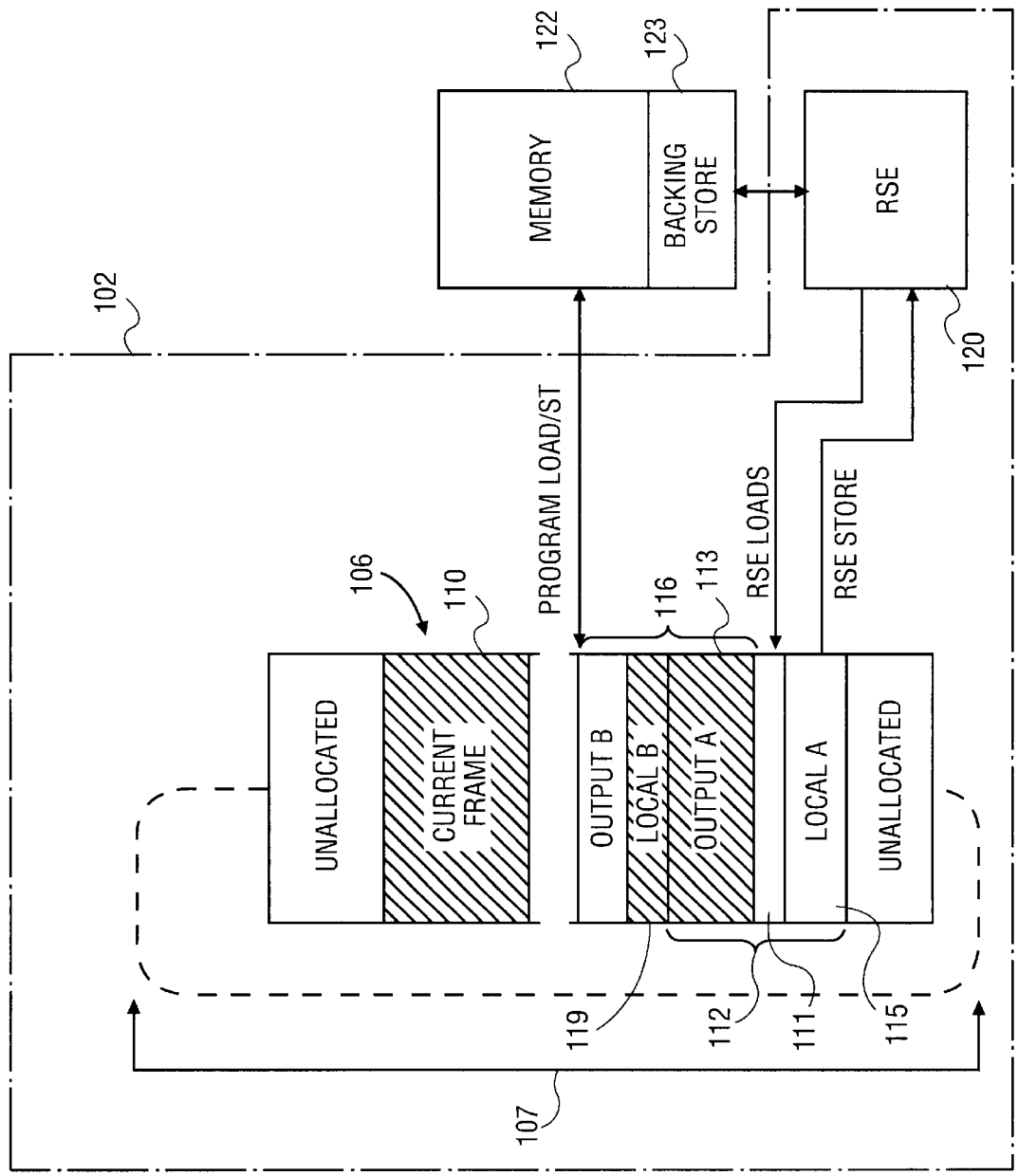
FIG. 1 illustrates a block diagram of a microprocessor that incorporates a register stack architecture.

FIG. 1 illustrates a block diagram of an exemplary microprocessor 102 (shown in broken lines) that incorporates a register stack architecture and within which the present invention may find application. Microprocessor 102 includes a register stack (RS) 106 and Register Stack Engine (RSE) 120 coupled thereto. RS 106 may be used, by way of example, for storing (in stacked registers included therein) parameters and other values belonging to different procedures that are executed by microprocessor 102. In the description presented herein the term "store" in connection with the RS 106 refers to electrically preserving a digital signal that represents a binary value. RS 106 is coupled to a memory 122 that includes a storage area (backing store 123). Backing store 123 may store therein the content of specific registers of RS 106 when certain events occur, such as when RS 106 does not have sufficient space (registers) left for storing data in connection with certain procedures upon occurrence of a procedure call.

A register stack architecture allows multiple procedures to efficiently share a large register file (RS 106), by stacking procedure call frames, such as procedure frame 112, in registers. As the frequency of processors typically grows faster than access time to memory, a register stack architecture helps reduce the number of memory accesses that may need to be performed by a processor executing a program that includes a number of procedures.

Register stack 106 includes a variable of number of general registers that are available to all programs for computation at all privilege levels. In one embodiment of the present invention described herein, RS 106 includes a minimum of 96 65-bit general registers. Each general register may typically include a number of bits for data storage and another number of bits to encode attributes of the data In one embodiment according to the present invention, each general register has 64 bits of normal data storage plus attributes. In the particular embodiment of microprocessor 102 each general register has an additional bit, NAT (Not a Thing) which provides information that indicates that a deferred exception occurred and is recorded.

The set of general registers is partitioned into two subsets: a first subset (static subset) (not shown) that is software visible (available) to all procedures and includes a number of general registers; and a second subset 107 (stacked subset) that includes registers denominated stacked general registers. The stacked subset 107 is not software visible to all procedures. Rather, stacked subset 107 includes one or more groups of consecutive stacked registers that may be made available to a procedure by executing an ALLOCATE instruction resulting in allocation of a register frame 112. An ALLOCATE instruction (hereinafter referred to as "ALLOC") specifies the number of registers a callee expects to use. Each register frame 112 includes at least one register 111 (typically a plurality of consecutive registers) that stores data in connection with a respective procedure associated with that register frame. Data stored in the at least one register 111 may include the parameters of the respective procedure, for example, but is not limited thereto. The plurality of consecutive registers 111 includes a programmable number of local 115 and output 113 registers that make up one frame. Output registers 113 of register frame 112 include registers that may be shared with called procedures while local registers 115 include registers that may not be shared with called procedures.

For example, output registers 113 of register frame 112, that corresponds to procedure A (caller procedure) may be shared with a local portion 119 of frame 116 corresponding to procedure B (callee procedure). Sharing the output registers 113 of procedure A's register frame 112 with the callee procedure B is made possible without the need to save procedure A's registers to memory 122 and restore these registers from memory 122. Access to the output registers of procedure A by the callee B is provided by renaming virtual register identifiers, included in instructions, into physical register identifiers.

Register stack 106 further includes a current frame 110. A current frame is defined as a set of architected registers, visible to software, i.e., that may be read from and written to by software. Software, however, may not write outside the current frame. The current frame 110 is configured to move "up" (towards the top part of the figure) if there is a call to a procedure. The current frame 110 is configured to move "down" (towards the bottom part of the figure) if there is a return from a procedure call. Reading a stacked register outside the current frame may return an undefined result. Writing a stacked register outside the current frame may cause an illegal operation fault.

Each register frame 112 of a procedure has associated therewith a frame marker (not shown) that stores the state of the respective register frame. The frame markers include information relating to the sizes of the local and output portions of a frame. For example, a frame marker may include information related to the size of frame (sof) which provides a measure of the number of registers included in the register frame. A frame marker may also include information related to the size of local registers (sol) which provides a measure of the number of local registers of the register frame.

The frame marker of a current frame is called a current frame marker (CFM) and is stored in a dedicated register. On a call from a procedure the content of the CFM is saved by copying it to a previous frame marker (PFM) field in a previous function state (PFS) register (not shown). PFS includes therein multiple fields, such as the PFM field that includes values which are copied automatically from CFM on a call from a caller procedure.

Upon a call to a procedure, the current frame moves "up" in the RS 106 capturing a number of registers of RS 106 to be used by the callee. However, if register stack 106 does not include sufficient registers available for the callee (stack overflow), microprocessor 102 is stalled until a register stack engine (RSE) 120, saves to memory 122 sufficient registers of RS 106 thereby providing more available registers to RS 106. RSE 120 is a specialized hardware circuit that may use excess memory bandwidth in memory 122 to dynamically store (spill) registers, from outside the current frame 110 of RS 106, to a backing store portion 123 located in memory 122 concurrent with the processor's execution of instructions (program execution). RSE 120 is also configured to restore (fill) registers from the backing store 123 to RS 106 concurrent with program execution. At return from a procedure some of the caller's registers may have been saved by RSE 120 to backing store 123 but not yet restored (stack underflow). In this case, a return instruction causes stalling of microprocessor 102 until RSE 120 may restore an appropriate number of caller's registers.

While the static subset must be saved and restored at procedure boundaries according to software convention, the stacked subset is automatically saved and restored by RSE 120 without explicit software intervention. RSE 120 utilizes register frame information to save and restore registers from RS 106 to backing store 123 at the best opportunity independent of instruction execution in the callee and caller procedures.

Register Stack and Procedure Calls

Figure 2:
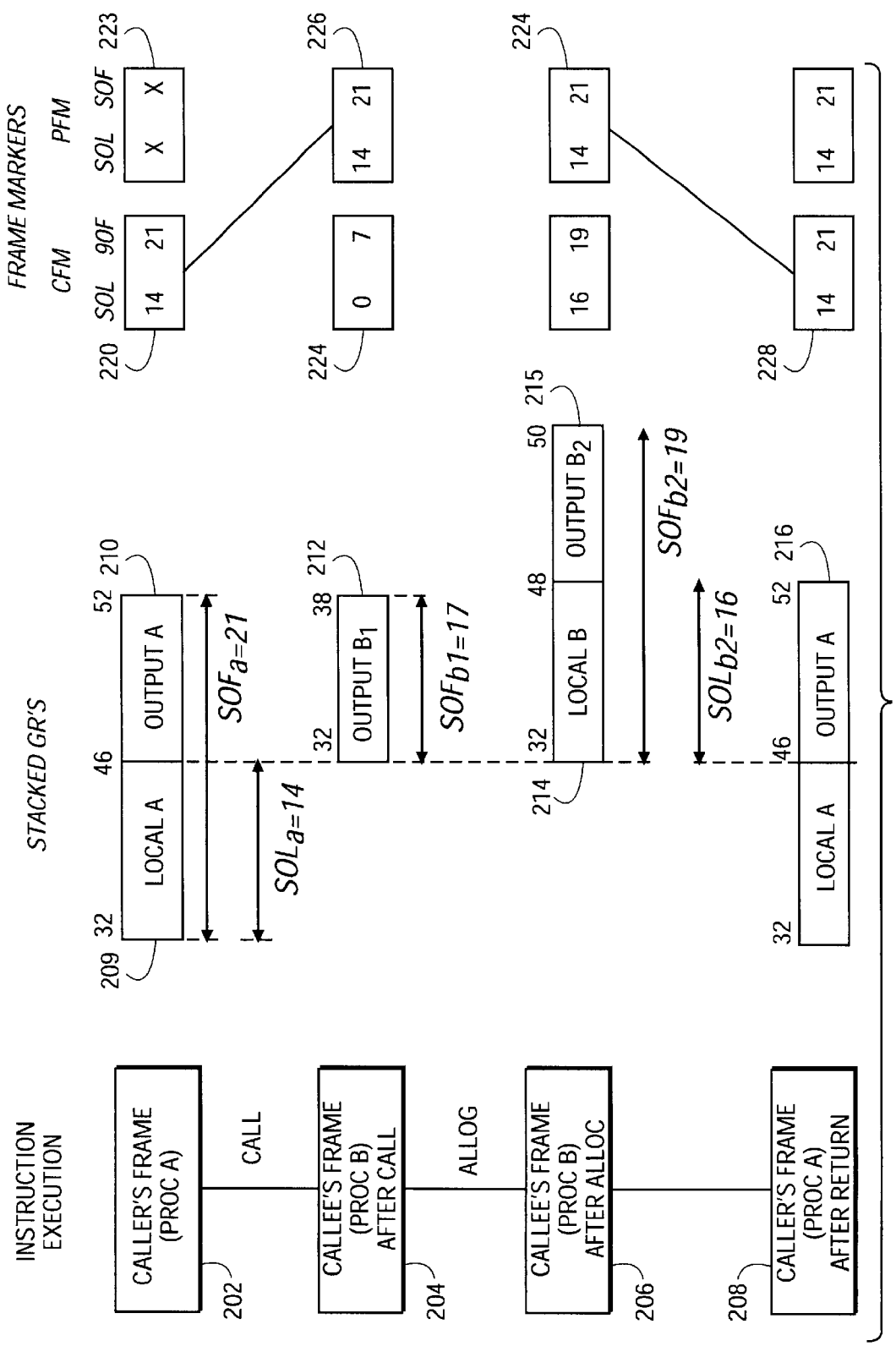
FIG. 2 illustrates a block diagram with states of a register stack for a procedure call from a first procedure to a second procedure.

FIG. 2 illustrates in block diagram form the state of a register stack (RS) for a procedure call from procedure A (caller) to procedure B (callee). The state of the RS is shown at four points: prior to the call (state 202), immediately after the call (state 204), after procedure B has executed an ALLOCATE instruction (state 206), and after procedure B returns to procedure A (state 208). As a consequence of a procedure call, a Current Frame Marker (CFM) 220 is copied (in this example) to a previous frame marker (pfm) field, of a Previous Function State (PFS) register, to be later restored on return from procedure B to procedure A. At state 202, procedure A's frame is defined, in this example, by registers 32–52 and includes 21 registers, (a size of frame ($sof_A$) of procedure A is 21). According to this arrangement, registers 32–52 are visible to procedure A. The CFM 220 for procedure A includes the pair (14,21) where "14" denotes a size of locals (sol) of procedure A's frame and "21" denotes the size of frame ($sof_A$) for procedure A. The pfm information 223 of this state is "don't care".

After a "call" by procedure A to procedure B, the RS "passes" to state 204. As a consequence of the "call," the CFM information 220 is copied to pfm field 226. After the contents of CFM 220 have been copied to pfm 226, a new value is written to CFM 224 creating a new current frame, in this example, with no locals (0 registers) and with a set of output registers (7 registers) which are caller A's output registers. The stacked registers are renamed such that, a first register in caller A's output area (register GR46) becomes GR32 for the output area of the callee B's register frame. In this way, the output area of the caller A is made visible to the callee B that knows that its registers start from GR32. The size of callee B's local area is set to 0 in CFM 224. In this example, the size of callee B's frame ($sof_{B1}$) 212 is set to the size of the caller's output area 210 equal to ($sof_A$–$sol_A$). In this way caller A's output area overlaps with callee B's output area thereby making caller A's output area visible to callee B. This overlap permits parameter and return value passing between procedures A and B.

At state 206 the local and output areas are resized using an ALLOC instruction. The CFM 220 may not be directly accessible to software and, in application programs, is updated through the execution of calls, returns, ALLOC, etc. The majority of application programs need only issue ALLOC instructions and save/restore the pfm field to effectively use the register stack. ALLOC specifies values that determine the size of frame (sof) and size of locals (sol) to ensure availability of registers in the current frame for the callee. Procedure B's frame is thus dynamically resized for local area 214 and output area 215 by issuing the ALLOC instruction. After the issuance of ALLOC, at state 206, the first seven registers of callee B's local area 214 have the same content as the content of the seven registers found in caller A's output area 210. After a return, at state 208, CFM 220 of procedure A is restored from PFS.pfm field 224 of procedure B. Also, register renaming is reset to the caller A's configuration, i.e. the local registers for procedure A are renamed to 32–45 and the output registers for procedure A are renamed to 46–52.

Register Stack and Backing Store

Figure 3:
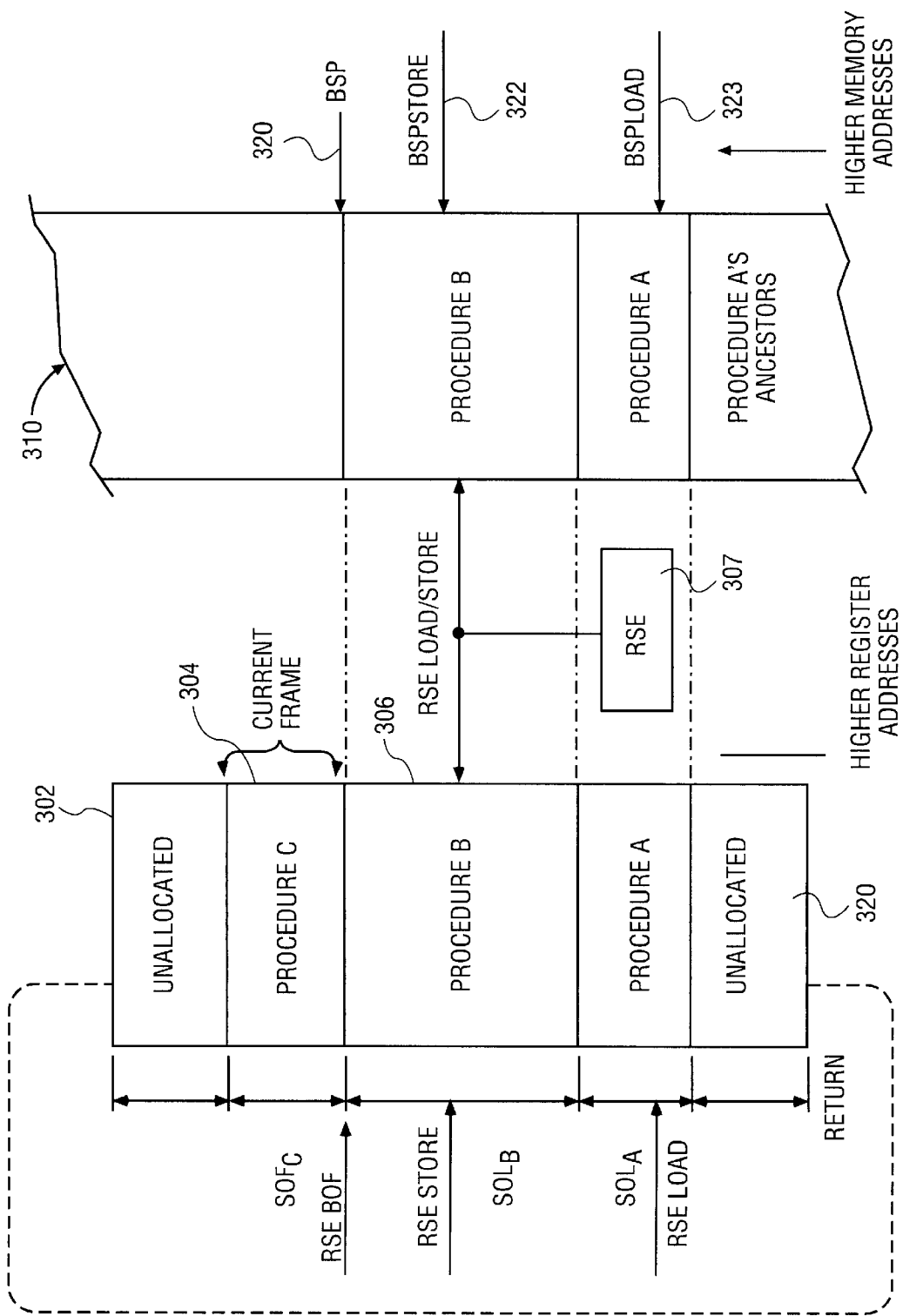
FIG. 3 illustrates a block diagram of a register stack and of a backing store portion of a storage device.

FIG. 3 illustrates a block diagram of a register stack (RS) 302 and of a backing store portion 310 of a storage device (hereinafter referred to as "backing store"). Register frames 306 are mapped onto a set of physical registers in the RS 302 which operates as a circular buffer containing most recently created frames. When a current frame 304 moves down as a result of a return from a procedure, then registers beyond the current frame (above in FIG. 3) are not allocated. Such unallocated registers have a circular configuration as shown in FIG. 3. The circularity of the RS 307 is related to the renaming mechanism implemented by the processor according to the present invention. RSE 307 may operate (perform stores and loads) on all parts of RS 302 outside current frame 304. The registers shown below current frame 304 include the frames of the parent procedures (procedures A and B in the figure) of current frame 304 that corresponds to procedure C.

Backing store 310 is configured to store local registers of each register frame. The output area of a register frame is not spilled to the backing store 310 (unless it later becomes part of the callee's local area). Within each frame, registers are organized such that lower address registers of a respective frame are stored at lower memory addresses of backing store 310. Backing store 310 is organized as a stack in a memory that grows from lower to higher memory addresses in the direction of the arrow illustrated at the bottom-right part of FIG. 3. In another embodiment of the present invention, backing store 310 may store the content of registers of the RS at addresses that grow in the direction opposite the arrow illustrated at the bottom-right part of FIG. 3.

The RS includes one portion (dirty partition) that stores dirty registers. Dirty registers are defined as registers, from previous stack frames, of the RS that have not been saved to the backing store. The backing store is implemented to store consecutive dirty registers in the order these dirty registers are stored in the RS. Backing store 310 is defined by backing store pointer 320 stored in a backing store pointer register (BSP) and a backing store pointer for store operations (BSPSTORE) 322 stored in a BSPSTORE application register. The backing store pointer (BSP) defines a top of the backing store, i.e., the highest address below which RSE 307 stores dirty registers belonging to the stacked subset of RS 302. BSP is an application register that is visible to software. The BSPSTORE application register contains the address (BSPSTORE pointer), of a memory location in backing store 310 where a next stacked register of RS 302 is spilled by RSE 307. BSP and BSPSTORE define a portion in the backing store where remaining dirty registers from the RS can be stored. The addresses included in both BSP and BSPSTORE registers are aligned to an 8-byte boundary. The microprocessor according to the present invention further includes a register called Backing Store Pointer for Load operations (BSPLOAD) 323. BSPLOAD includes a pointer to a location in the backing store from which RSE performs load operations.

There are a number of physical register pointers (physical register numbers) that correspond to the Backing Store Pointers explained above. For example, RSE.BOF corresponds to BSP and it represents the bottom of the current frame, or, more specifically, the physical register number of the first register in the current frame adjacent to the border between the dirty partition and the current frame. A value RSE.Storereg is defined as the physical register number of next register to be stored by the RSE in the backing store. RSE.Storereg corresponds to BSPSTORE. The physical register corresponding to BSPLOAD is called RSE.Loadreg and is the register adjacent to the next physical register to be loaded by the RSE. RSE.BOF, RSE.Storereg, RSE.Loadreg are called RSE internal state elements. These elements are not directly exposed to the programmer as architecturally visible registers. As a consequence, RSE internal state does not need to be preserved across context switches or interruptions. Rather, RSE internal state is modified as a side effect of register stack related instructions. For example, RSE.BOF may change as a result of a CALL instruction. In the following discussion, the embodiments of the present invention disclosed herein are discussed in connection with backing store pointers, such as BSP, BSPSTORE, etc. The present invention, however, may also by implemented in connection with physical register numbers such as RSE.BOF, RSE.Storereg, etc.

The RSE 307 is configured to spill information independent of instruction execution, in conjunction with locations in the backing store that have addresses lower than BSP but higher than backing store pointer for store operations (BSPSTORE) 322. The RSE 307 is also configured to fill (load) registers in the RS with information that resides in the memory location where BSPLOAD 323 points.

Figure 4:
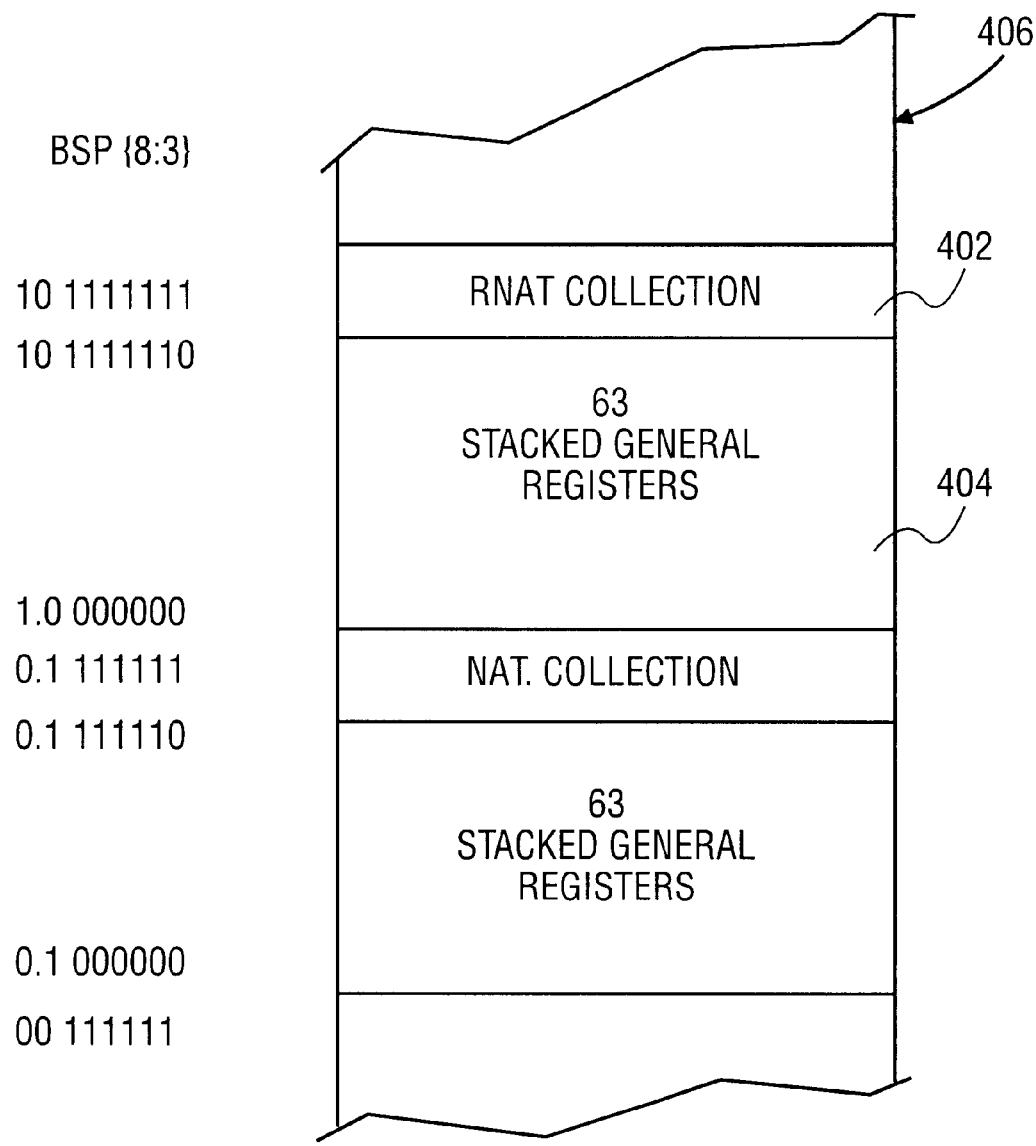
FIG. 4 illustrates a block diagram of a portion of the backing store.

RSE 307 also spills/fills NAT bits corresponding to the stacked registers, as will be described in further detail below. The NAT bits for the stacked subset are spilled/filled in groups of 63 as shown in FIG. 4. A NAT bit is a bit associated with a corresponding one of the stacked registers stored in RS 302, and indicates whether the content of the respective register is valid or not. When RSE 307 spills a register to the backing store, the corresponding NAT bit is copied to a RNAT application register which is a 64-bit register, that stores a collection of NAT bits for 63 consecutive registers. Whenever bits 8:3 of BSPSTORE are all "1"s, the RSE 307 stores the RNAT register to backing store 406.

Figure 5:
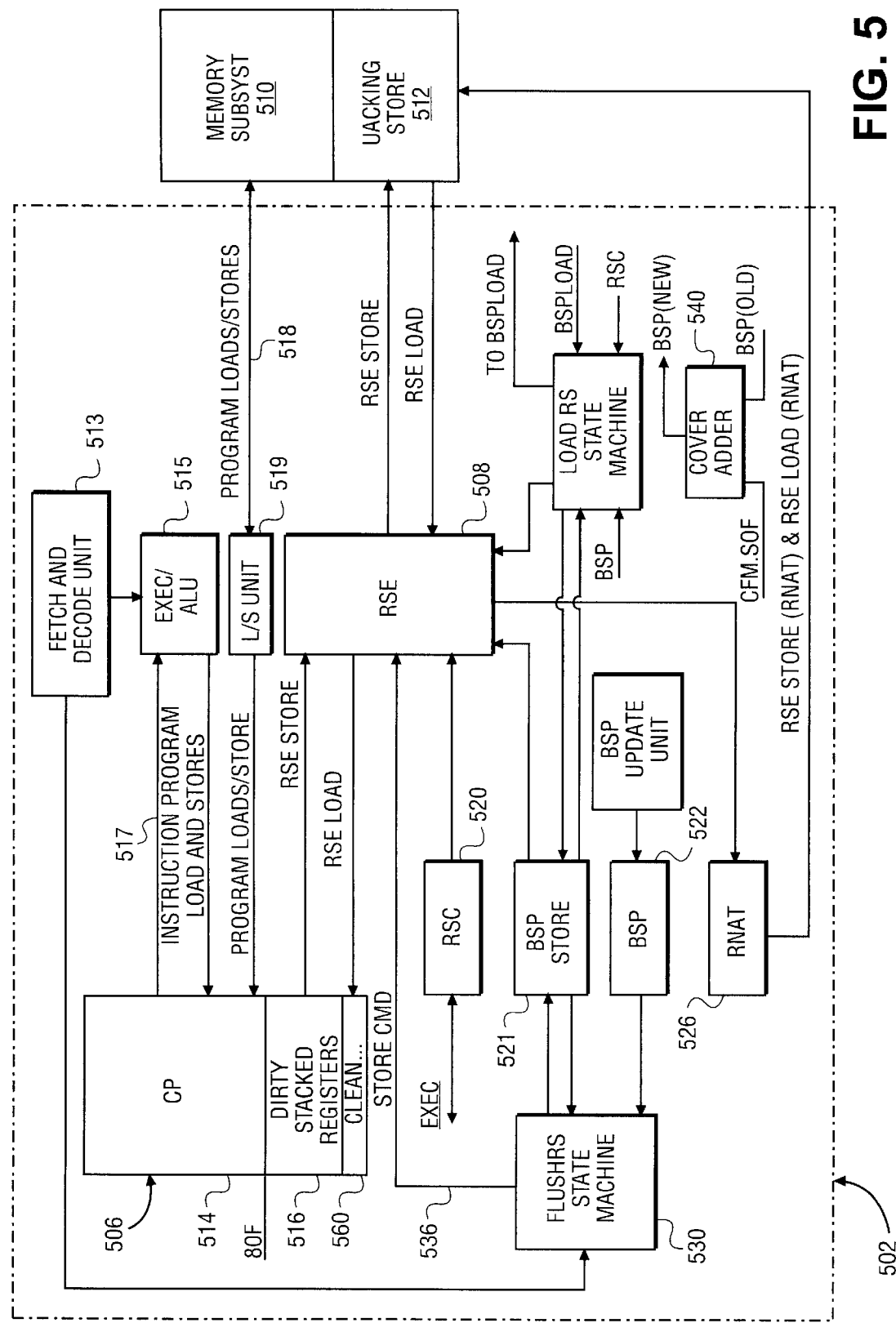
FIG. 5 illustrates a block diagram of a microprocessor configured in accordance with one embodiment of the present invention.

Block Diagram of a Microprocessor According to One Embodiment of the Present Invention FIG. 5 illustrates a block diagram of a microprocessor 502 according to the present invention. Microprocessor 502 includes a register stack 506. Register stack 500 includes a portion thereof allocated for a current frame 514 and a portion thereof allocated for dirty register subset 516 (hereinafter referred to as "dirty subset"). Dirty subset 516 includes a plurality of registers that may be spilled to a backing store portion 512 of a memory subsystem 510. The registers of the stacked subset 516 may also be filled with information from backing store 512 via a register stack engine (RSE) 508 that is coupled to both backing store 512 and the stacked subset 516.

Microprocessor 502 executes a programmed stream of instructions that initially are stored in memory subsystem 510. Instructions from memory subsystem 510 may be driven to an instruction cache that may be included in a fetch and decode unit 513. The fetch and decode unit 513 receives an instruction pointer from an instruction pointer generator (not shown) based on which it fetches an instruction from the instruction cache to an EXECUTION/Arithmetic Logic Unit (ALU) 515. Execution/ALU unit 515 is coupled to register stack 506 via line 517. Some of the instructions fetched to the EXECUTION/ALU 515 may be instructions related to a caller or a callee procedure. Typically, upon a procedure call, the parameters of a caller procedure are stored in register stack 506. Upon occurrence of certain conditions, such as stack overflow, data stored in RS 506 is saved to memory subsystem 510 to be preserved for further later usage. Data within stacked subset 516, outside the current frame, is typically saved to backing store 512 of memory 510 by way of the Register Stack Engine (RSE) 508. Data included in current frame 514 may be stored to memory 510 or loaded from memory 510 by way of load/store unit 519, which performs program load and store operations with respect to procedure related information. The load/store unit 519 is controlled by the software which has "visibility" into the current frame.

RSE 508 operates concurrently with program execution by performing spills from stacked subset 516, outside the current frame, to backing store 512 and fills from backing store 512 to a portion 518 of the stacked subset allocated for clean registers. Clean registers are defined as registers that contain values from previous register frames that have been previously stored in the memory. The operation of RSE 508 is controlled by a register stack configuration (RSC) application register 520 which is coupled to RSE 508. RSC 520 includes two mode bits that determine the mode of the RSE. Bit zero of the RSC mode enables eager RSE stores and bit one enable eager RSE loads. When RSE 508 operates in an "eager" mode, RSE 508 performs register spills and fills independent of instruction execution. An eager mode is defined as a mode where RSE performs spills or fills operation in a speculative fashion. RSE 508, when acting speculatively, saves and restores registers ahead of time (i.e., before the software "tells" the RSE 508 to perform saving or restoring of registers). In an eager mode, the RSE 508 can perform load and stores operation without stalling the processor. When both mode bits are zero (enforced lazy mode), RSE 508 issues mandatory loads and stores (i.e., RSE 508 spills and fills registers only when it is required to do so by the software). Contrasted to the eager mode in the lazy mode, the RSE acts (spills and fills registers) only if an overflow or underflow occurs. RSE 508 may be controlled at all privilege levels by way of several instructions and by accessing four application registers: RSC 520, BSP 522, BSPSTORE 521 and RNAT 526.

Furthermore processor 502 includes a FLUSHRS state machine 530 coupled to the Fetch and decode unit 513. FLUSHRS state machine 530 causes flushing to the backing store 512 of the subset of dirty registers 516 stored in RS 506 once a FLUSHRS instruction is fetched and decoded by Fetch and decode unit 513. When a FLUSHRS instruction is encountered in the instruction stream, the FLUSHRS state machine 530 asserts a STORE CMD signal to RSE 508 via line 536. The STORE CMD signal instructs RSE 508 to spill to backing store 512 all dirty registers located in stacked subset 516 (dirty partition) of RS 506.

The FLUSHRS instruction may be used to synchronize software with the contents of the register file and the state of the backing store 512 located in memory 510. Such synchronization occurs in certain circumstances before a switch from one context to another. Synchronization is critical to allow operation of the RSE in the eager mode. When RSE operates eagerly, software does not know what is the number of dirty registers currently in the register stack. Upon execution of the FLUSHRS instruction, instruction execution is stalled while the RSE 508 stores all dirty registers to backing store 512.

Process for Flushing a Register Stack According to One Embodiment of the Present Invention For the purposes of the present specification, the term "context switch" shall be taken to refer to any change in the operating environment of a processor. Accordingly, the term "context switch" shall be taken to include, but not limited to, the redirection of a processor from executing a first set of instructions to executing a second set of instructions (e.g., from executing a first application program to servicing an interrupt request or to executing a second application program, or vice versa). The term "context switch" shall also be taken to be inclusive of what is commonly understood to be within the ambit of the term "task switch".

Figure 6:
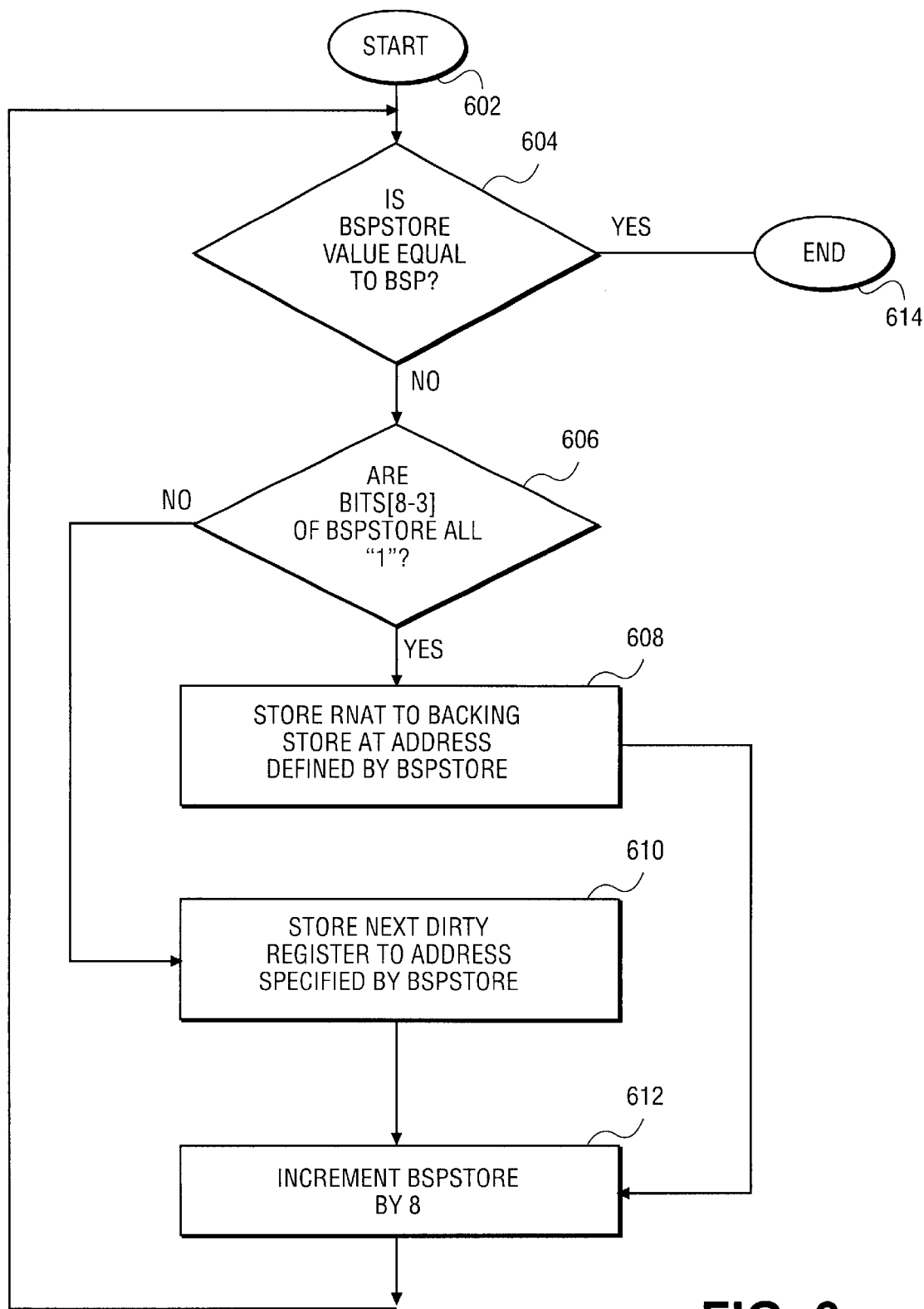
FIG. 6 illustrates a flow chart in connection with a process for flushing a register stack using a FLUSHRS instruction.

FIG. 6 illustrates a process for flushing a register stack (RS) device according to the present invention. This process is triggered when a FLUSHRS instruction is encountered in the instruction stream. The FLUSHRS instruction is a novel instruction that is typically inserted in a stream of instructions to cause saving of all dirty registers from the register stack to the backing store, thereby contributing to a synchronization of the RSE 508 with the processor's execution of instructions, which will be explained later in this section. The process for flushing a RS device, described in connection with the flow chart illustrated in FIG. 6, may be performed in connection with a processor that includes a register stack (RS) device that is in a first state characterized by the RS configured to store in its registers information related to a first context. The processor is configured to execute instructions in connection with the first context. The processor further includes a register stack engine (RSE) in a first state. The RSE is configurable to exchange information between the RS and the storage area independent of instruction execution. The present invention also applies to embodiments where the RSE exchanges information between the RS and the backing store as a result of execution of instructions, i.e., dependent of instruction execution. The RSE is thus configurable in one of an instruction execution dependent and independent modes. The storage area (hereinafter referred to as backing store) is a storage portion in a memory device dedicated for storing information related to the first context which in most cases comprises dirty registers.

The process for flushing the RS according to the present invention starts at step 602 when a FLUSHRS instruction is encountered in a stream of instructions that are executed by a processor. Execution of a FLUSHRS instruction causes the process to flow to decision block 604 where it is determined whether the values, stored in BSP and in BSPSTORE have a predetermined logical relationship relative to each other. In the embodiment of the process described in connection with FIG. 6 the predefined logical relationship between BSP and BSPSTORE is that BSP equals BSPSTORE. Accordingly, at block 604, BSP and BSPSTORE are checked to determine whether they are equal.

If at block 604 it is determined that BSP equals to BSPSTORE, the process ends at block 614. However, if BSP and BPSTORE are not equal, which means that not all of the dirty registers of the RS have been saved to the backing store, the process flows to decision block 606. At decision block 606 it is checked whether a predetermined number of bits of BSPSTORE are all asserted (i.e., logic "1") to determine whether attribute RNAT bits should be saved to the backing store. In one embodiment of the process according to the present invention the process determines whether bits 8–3 of BSPSTORE are all asserted but the present invention is not limited in scope to this implementation. As one may see in the implementation of the backing store described in connection with FIG. 4, RNAT collections are stored at the address indicated by the BSPSTORE, when bits 8–3 of the BSPSTORE address are asserted. This indicates that RNAT collections are saved after 63 consecutive dirty registers have been saved to the backing store.

However, if at decision block 606 it is determined that bits 8–3 of BSP are not all asserted, which means that the RSE 508 has not completed the spilling of 63 consecutive dirty registers to the backing store 512, the process flows to block 610 where RSE 508 stores a next dirty register to an address specified by BSPSTORE. The process then flows to block 612 where BSPSTORE is incremented to point to a next location in the backing store 512. In the embodiment of the present invention described herein BSPSTORE is incremented by "8" bytes as the size of the registers is 64 bits. Note that while the present invention is discussed in connection with a 64-bit processor, the present invention applies to processors with other numbers of bits. Herein, the concept of incrementing of BSPSTORE by 8 bytes can be extended to a number of bytes that constitutes the size of the architecture implementing the present invention. The process may also arrive to block 612 from block 608, once the attribute RNAT bits have been saved to the backing store. The process further flows back (loops) to decision block 604.

The FLUSHRS instruction, which triggers the process explained in connection with FIG. 6 may be used for synchronizing the backing store memory image and the RSE 508 with processor's execution of instructions (software). Since the RSE 508 is spilling and filling registers concurrently with processor execution (independent of processor's execution of instructions), a synchronization process may be needed when an operating system or user space thread switch routine needs to switch context from a source context to a target context.

Synchronous Backing Store Switch Process

Figure 7:
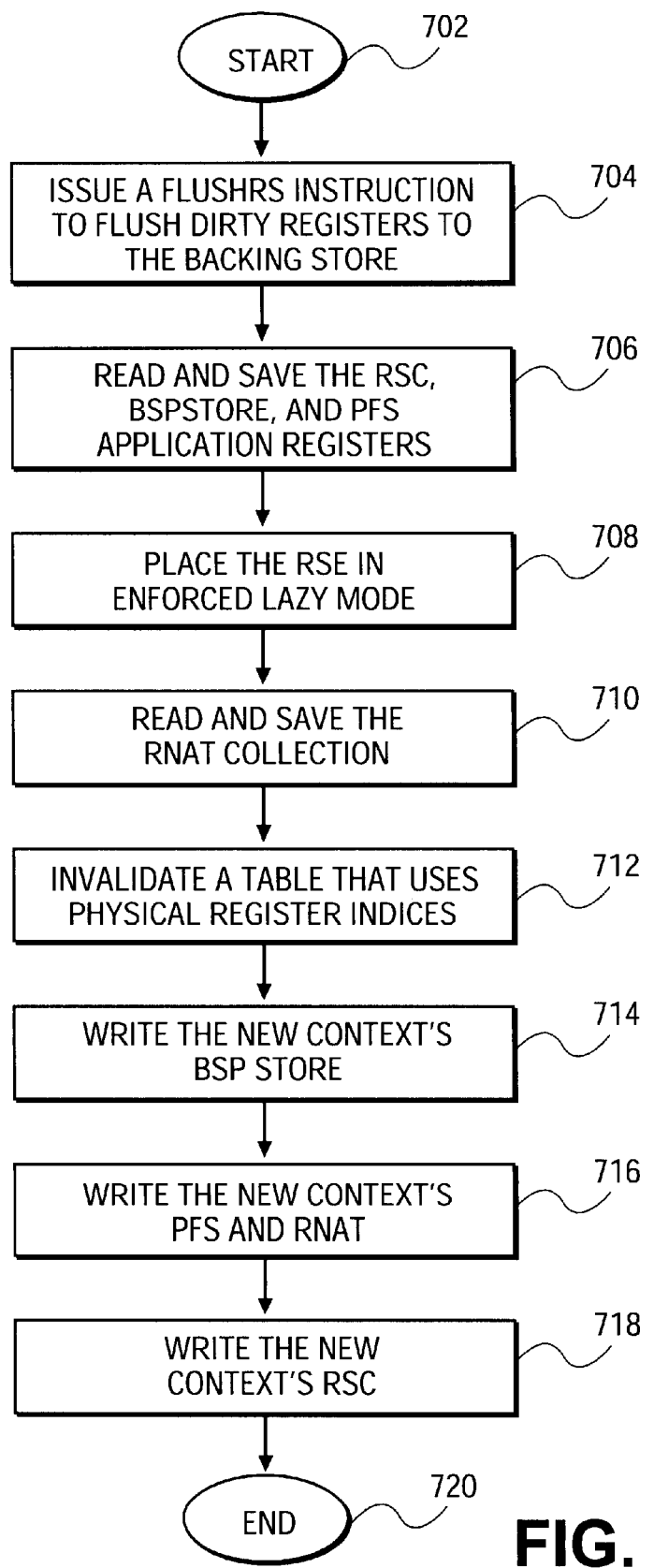
FIG. 7 illustrates a flow chart diagram in connection with a process for synchronous context switching using a FLUSHRS instruction.

FIG. 7 illustrates a flow chart diagram in connection with a process (first process) for switching contexts according to the present invention. The process in connection with the flow chart diagram illustrated in FIG. 7 performs a synchronous backing store switch from a first context (source context) to a second context (target context). In the embodiments of the process of the present invention described herein, the synchronization process causes the information stored in the backing store to be synchronized with the processor's execution of instructions (software). This process may be implemented as a code sequence that may be executed by a processor. The code sequence, among other things, causes the saving of a state of RSC, RS and RSE of the source context before the switch to the target context. When the processor has executed an arbitrary unknown number of instructions, (after the context switch) in connection with the target source, the dirty registers of the source context may, after the switch, be restored and loaded back into the register stack.

The process starts at block 702 from where it flows to block 704 where all the dirty registers, in connection with the first context, are saved from the RS to a first storage area (backing store). This is performed by execution of a FLUSHRS instruction. When a FLUSHRS instruction is executed, all dirty registers stored in the RS (previously unsaved), are flushed (saved) to the backing store. Saving the dirty registers to the backing store preserves the state of the RS in connection with the source context so that on return from the second context to the first context, software may reload registers of the source context into the RS from the backing store.

At block 706, the state of RS and RSE are preserved by reading and saving registers RSC, BSPSTORE and PFS. Because RSE related resources such as RSC, BSP, BSPSTORE and RNAT are architecturally visible and therefore are exposed to software as applications registers, these registers need to be preserved before the context switch from the source context to the target context. Typically, after the execution of the FLUSHRS instruction the content of BSPSTORE equals the content of BSP. Thus, saving BSPSTORE allows software to return to the address stored in the BSP. At state 706 register PFS is saved as its content may be altered by the saving of the current frame marker therein.

The synchronization step further includes the step of placing the RSE in enforced lazy mode at block 708. Since the RSE, when set in the eager mode, is spilling and filling registers, independent of instruction execution, software may not know the state of the RS and of the backing store with respect to the dirty registers stored in these devices at a given moment in time. RSE is placed in enforced lazy mode, by clearing certain bits in the RSC that indicate the mode in which the RSE is set. In enforced lazy mode RSE does not perform spills or fills independent of software.

At block 710, the RNAT application register is preserved to the memory (read and saved to the memory) for the purpose of preserving to the memory partial NAT collections to be later reloaded from the memory when returning to the source context. Since writing to BSPSTORE may cause the contents of the RNAT register to become undefined, software must preserve the contents of RNAT before writing to BSPSTORE.

The process then passes to block 712 where at least one table including information associated with physical registers number, is invalidated if the context switch causes program values to be placed in different physical registers. The process further loads, at block 714, a second state of the RS and RSE related to the second context (target context). This includes writing the BSPSTORE register with the BSPSTORE value for the second context. The BSPSTORE value for the second context is typically the BSP value for the second context. Further, at step 716 the second context's PFS and RNAT are written to update the current frame marker and the RNAT data in connection with the second context. Then, at step 718, second context's RSC register is written with control data in connection with the second context. This operation sets the mode (eager, lazy, etc.) in which the RSE is programmed.

Asynchronous Backing Store Switch Processes
1. Process Utilizing the Cover Instruction FIG. 8 illustrates a flow chart diagram of an embodiment of a process for switching from a first context (context A or interrupted context) to a second context (context B or interrupting context) as a result of an asynchronous interruption. During an asynchronous interruption, the interrupted context is unaware of the interruption. "COVER" is a new instruction encountered in the stream of instructions that may be used when software, that is running in connection with a first context, is asynchronously interrupted. The interrupt causes an interrupt handler to take over the process. The interrupt handler uses the COVER instruction to synchronize with what RSE was doing before the interruption.

The process starts at block 802 from where it passes to block 804. At block 804, it is determined whether a first context is interrupted by a second context. When an interruption occurs, the current frame marker (CFM) remains unchanged and the processor marks an interrupt frame marker (IFM) register as invalid by clearing a IFM.VALID bit of the IFM. The IFM is a register that stores, upon certain conditions, (execution of COVER instruction for example) the content of CFM. The CFM defines the set of registers currently in use by software, i.e. that are directly controlled by the processor at a given point in time. All other stacked general purpose registers are controlled by the RSE. The process then flows to decision block 805 where the IFM.VALID bit is cleared.

At block 806 it is determined whether an interrupt handler in connection with the interruption of the first context, needs to create a new frame on the register stack (RS). If the interrupt handler is a "light-weight" interrupt handler that does not need to use the register stack, the process flows to decision block 808. At this block, the interrupt handler, that does not use the RS, is executed. Light-weight interrupt handlers may include Translation Lookside Buffer (TLB) miss handlers, speculation trampolines, deferred handlers, etc. The process then flows to decision block 818 where it is determined whether the IFM.VALID bit is set. If the IFM.VALID bit is set, the process flows to block 820 where CFM is restored from IFM. If at block 818 it is determined that the IFM.VALID bit is not set, the IFM contents are ignored and CFM remains unmodified.

However, if at decision block 806 it is determined that the interrupt handler needs to create a new frame on the registers of the RS, the process flows to block 807 where contents of the CFM are preserved to ensure that execution of the interrupt handler that uses RS does not destroy CFM. Accordingly, at blocks 807 and 814 the COVER instruction is executed. Execution of the Cover instruction causes copying the contents of the CFM to IFM and setting of the IFM.Valid bit. At block 814 the COVER instruction causes current frame of the RS, in connection with the interrupted context, to be accessible to the RSE. This is performed by allocating a zero size CFM thereby adding the current frame to the set of registers controlled by the RSE. This ensures that the portion of the RS (including the current frame) that was in use by the interrupted context may be saved so that the new context can use the RS. The allocation of a zero size of the CFM thereby adding the current frame to the set of registers controlled by the RSE is performed at a hardware level by adding to the old BSP, i.e., the BSP before the interruption, the number of registers included in the current frame, i.e., the number stored in the field CFM.SOF. A new BSP is thus obtained plus the number of intervening attribute NAT bit collections.

At block 816 the process causes execution of the interrupt handler that uses the RS. Before re-enabling interruptions, the handler saves the IFM to a general purpose register to save the interrupted CFM and to allow IFM to be further used by other subsequent interrupt handlers. After the execution of the interrupt handler at block 816 or block 808, the interrupt handlers complete by executing a return from interrupt (RFI) instruction. The RFI instruction causes inspection of the IFM.valid bit at block 818. If this bit is set, the process flows to block 820 where the CFM is restored from IFM by copying the IFM contents into the CFM. This restores the interrupted CFM, which may cause the RSE to load registers from the backing store, if needed. If the IFM.VALID bit is not set, the IFM contents are ignored and CFM remains unmodified at block 822.

In so treating light-weight interruptions, the embodiment of the process according to the present invention described herein provides capabilities including: high performance interruption handling, as light-weight handlers do not need to synchronize the RSE, and therefore to perform a COVER instruction; high performance of register spill/fill, since the RSE continues saving or restoring stack registers in the background throughout the light-weight interruption; and high performance of instruction emulation handlers (e.g. unaligned handlers) as access to the current frame is possible without being in control of the RSE.

FIG. 5 illustrates in block diagram form a COVER circuit 540 that is implemented by way of an adder. The adder receives at one input thereof a signal CFM.SOF and at another input thereof the BSP pointer (the old BSP pointer). A new BSP pointer is generated at the output of the adder circuit 540 by adding to the BSP pointer the size of the current frame that is included in the CFM.SOF field of the CFM register plus the number of intervening NAT collections.

2. Processes Utilizing the LOADRS Instruction

There are a number of context switch events where a source backing store (context A) does not need to be accessed until execution of the target context (context B) completes. This is the most frequent form of context switch, which occurs in every system call. The source context in this case is the application stack and the target context is the operating system. These system call context events are sometimes referred to as domain crossing events (crossing from one privileged domain into another). Performance may be improved in connection with these types of context switch events by not flushing dirty registers to the memory when such domain crossing occurs. Upon a context switch, instead of writing all dirty registers to context A's backing store, by execution of a FLUSHRS operation, the source backing store is "torn" at a specified point (tear point). The tear point defines the dirty register written by the RSE to the source backing store (A) at a time when the system call occurs. A target stack, e.g., the operating system (context B), may be established in the RS to preserve therein remaining registers from context A, i.e. registers above the tear point, that would have been spilled to context A's backing store, had the context switch not occurred.

At context switch, the BSPSTORE's content in connection with the first context is saved to memory. A new address corresponding to context B's tear point is then written to BSPSTORE. When BSPSTORE is written with a new address room is automatically allocated on context B's backing store for dirty registers from context A. The memory area, defined by BSPSTORE and BSP (second backing store) in connection with context B is configured to store information related to context A by re-calculating a new BSP based on the new BSPSTORE and the number of dirty registers in the RS before the context switch.

Figure 9:
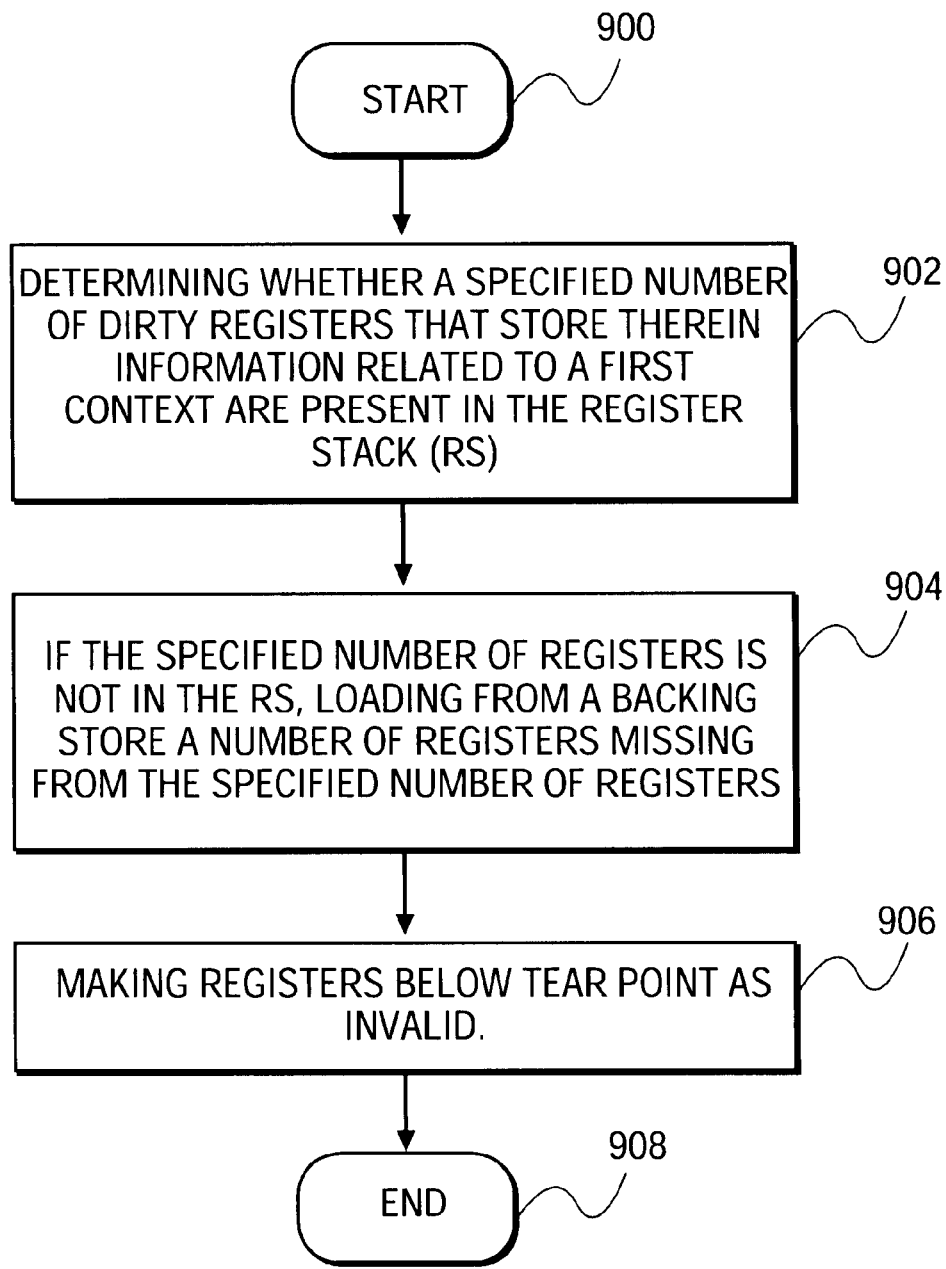
FIG. 9 illustrates a flow chart diagram in connection with a process for switching contexts triggered by LOADRS instruction.

FIG. 9 illustrates a flow chart diagram in connection with a third embodiment of a process for switching contexts according to the present invention. The embodiment of the process described herein may be used in connection with a return to a torn-away stack (interrupted context stack A) after the occurrence of a context switch that did not necessitate flushing of the RS to the backing store, such as the type of context switch explained above. Before the return to the torn-away backing store a portion of a backing store of interrupting context B was allocated for storing dirty registers in connection with both interrupting context (B) and the interrupted context (A). Since dirty registers in connection with the interrupted context (A) are not necessarily automatically flushed to the backing store upon context switch from A to B, these dirty registers are stored in the RS contiguously with the dirty registers of interrupting context (B). This allows the RSE, after the switch to context B, to perform eager RSE fills thereby increasing the likelihood that before returning to the interrupted context (A), the RS may reload therein a number of dirty registers of the interrupted context (A). Eager RSE fills to the RS causes a reduction in the time that otherwise, RSE may have needed to fill all the registers of context A missing from the RS at the time the switch back (return) to context (A) occurs.

The embodiment of the process of context switching according to the present invention allows limited multiple contexts, in this example contexts A and B, to share the RS, in connection with context switch events where the source context (context A) does not need to be accessed until the execution of the target context (context B) is complete. The process of switching contexts illustrated in connection with the flow chart of FIG. 9 is triggered by execution of a LOADRS instruction. A LOADRS instruction confers the capability of loading to the register stack a specified number of dirty bytes (that make up dirty registers), from context B's backing store that are stored below the current BSP (the BSP in connection with context B) thereby ensuring that the specified number of dirty bytes is present in the register stack. Typically, the specified number of dirty bytes below BSP includes the total number of dirty bytes related to context A. If the specified number of dirty bytes is not present in the register stack, the number of dirty bytes missing from the register stack is loaded at block 904 from the backing store. If all dirty bytes are already in the RS, no memory traffic is required. At block 906, all registers of the stack and NAT collections which correspond to locations below the tear point are marked "invalid" in the RS. The invalidation is performed as the registers below the tear point may contain values that were used in connection with context B and, thus, these values are undetermined with respect to context A.

After execution of the LOADRS instruction is completed by loading in the RS all registers in connection with context A that are missing in the RS, all registers and RNAT collections between the current (interrupting context) BSP and ("tear point") are present and marked as "dirty" in the RS. At the end of the process, RS has the same configuration it had prior to the switch to the interrupting context.

Figure 10:
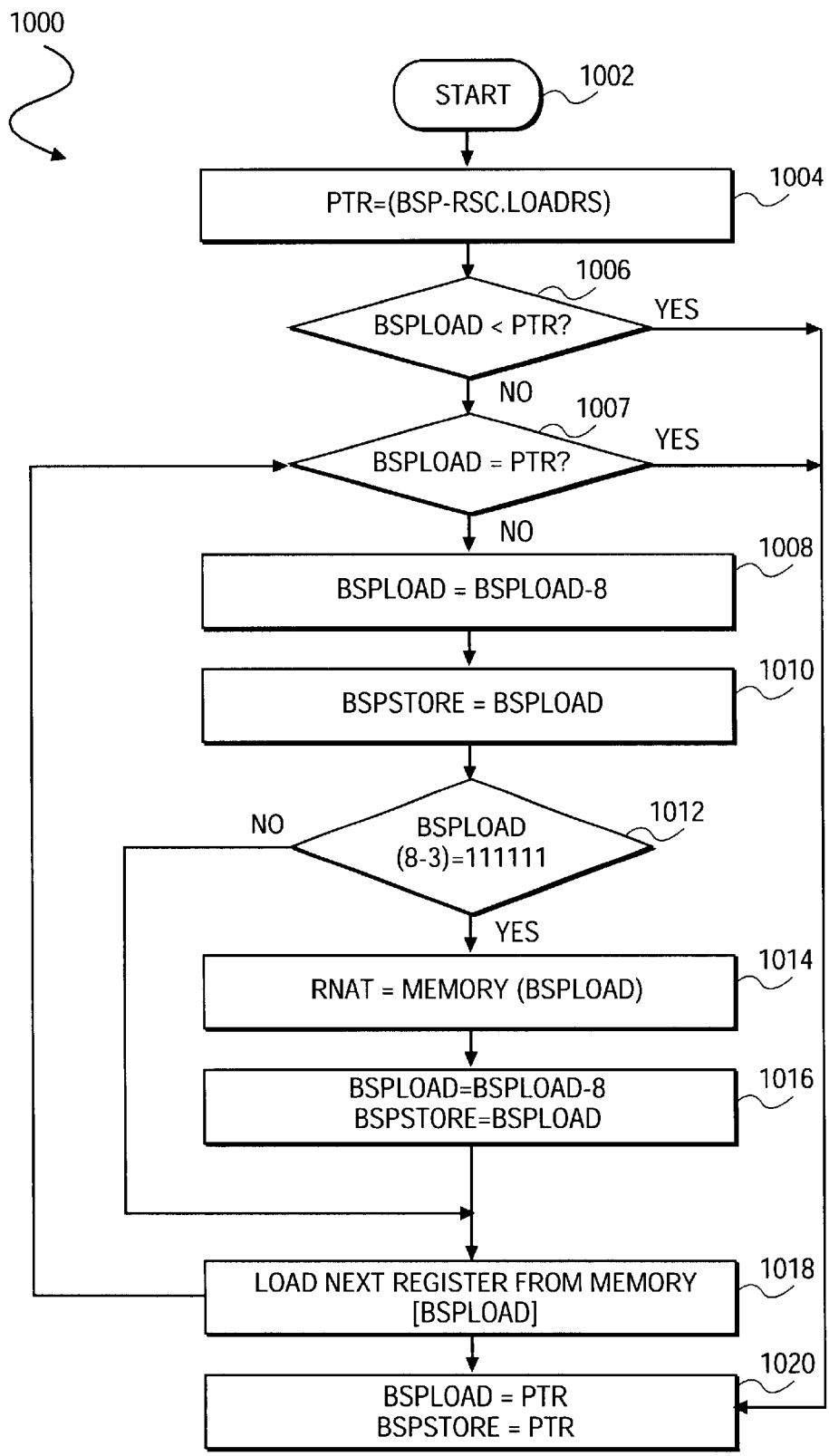
FIG. 10 illustrates a more detailed flow chart diagram in connection with the process for switching contexts triggered by LOADRS instruction.

FIG. 10 illustrates a more detailed flow chart diagram in connection with a process for switching contexts triggered by a LOADRS instruction. FIG. 10 is a simplified flow chart that does not take into account cases when a stack address wrap around occurs. By way of example, a wrap around may occur if BSP has a value of 8 and RSE.loadrs has a value of 16. Based on FIG. 10 and the following description, persons skilled in the art could generalize the scheme described herein for the case when a wrap around occurs. The process 1000 starts at step 1002 from where it flows to step 1004. At step 1004, a pointer (PTR) is assigned a difference between BSP and RSC.loadrs. The value RSC.loadrs represents a distance between the backing store's BSP and the tear point of that backing store. In this case, the pointer (PTR) points to a location in the backing store of the interrupting context (context B) where the content of the last dirty register of context A is stored. "Distance" is herewith defined as the number of dirty registers of the source context plus the number of intervening NAT collections that have not been saved to the backing store of the source context upon the context switch.

At step 1006, it is determined whether BSPLOAD is smaller than PTR. BSPLOAD includes a pointer to a location in the backing store from where RSE performs load operations. The fact that BSPLOAD may be smaller than PTR means that there are no more registers belonging to the source context that have not been loaded back to the register stack. If BSPLOAD is smaller than PTR the process flows to block 1020 as there is no need to load registers of the source context to the RS. When the process reaches to block 1020, it means that all dirty registers that were originally in the RS before the context switch to the target context are now in the register stack. The BSPSTORE pointer is then assigned the value PTR and the BSPLOAD pointer is also assigned the value PTR. This resets the backing store pointers such that upon switch back to context A, BSPSTORE points to a location in the backing store compatible to the number of dirty registers belonging to context A residing in the RS (i.e., the backing store has enough room to store the dirty registers of the RS belonging to context A).

At block 1007, if BSPLOAD is equal to PTR, the process flows to block 1020, where BSPSTORE and BSPLOAD are assigned the value PTR. If BSPLOAD includes a pointer that is larger than PTR, the process flows to block 1008, where BSPLOAD is assigned the value BSPLOAD-8. If BSPLOAD is larger than PTR, there are still registers belonging to context that have not been loaded to the RS. Assignment of BSPLOAD-8 to BSPLOAD causes the address included in BSPLOAD to point to a next location in the backing store a content of which is to be loaded to the RS. At block 1010 BSPSTORE is assigned the content of BSPLOAD.

At block 1012, it is determined whether bits 8:3 of the BSPS are all "1"s. If so, the location of the backing store to which BSPLOAD points to is written to RNAT 526 at block 1014. At block 1016, BSPLOAD is assigned the value BSPLOAD-8. At the same block, BSPSTORE is assigned the value BSPLOAD. Otherwise, the process continues to block 1018. At block 1018, a next register is loaded from the location in memory where the BSPLOAD address points. Note that if at block 1012, it is determined that the bits 8:3 of BSPLOAD are not all "1"s, the process jumps to block 1017. From block 1018, the process loops back to block 1007, where it is determined whether BSPLOAD is equal to PTR. During the process it may be determined whether an external interrupt is pending and enabled and if so the external interrupt is taken.

FIG. 5 illustrates a LOADRS control circuit that includes a state machine that may implement the process, the steps of which are illustrated in FIG. 10. The LOADRS state machine receives at the inputs thereof a BSP pointer, a BSPSTORE pointer, a BSPLOAD pointer, and a signal from the RSC register 520. The LOADRS state machine reads the value RSC.loadrs and subtracts this value from the BSP to obtain PTR. The LOADRS state machine then performs a series of operations such as comparisons, subtractions, assigning new values to the pointers, etc. to perform the steps illustrated and discussed in connection with FIG. 10. A LOADRS state machine according to the flow chart illustrated in FIG. 10 and the description thereof may be implemented by persons having ordinary skills in the art.

3. Processes Utilizing Both the COVER Instruction and the LOADRS Instruction (Asynchronous Backing Store Switch)

Figure 11:
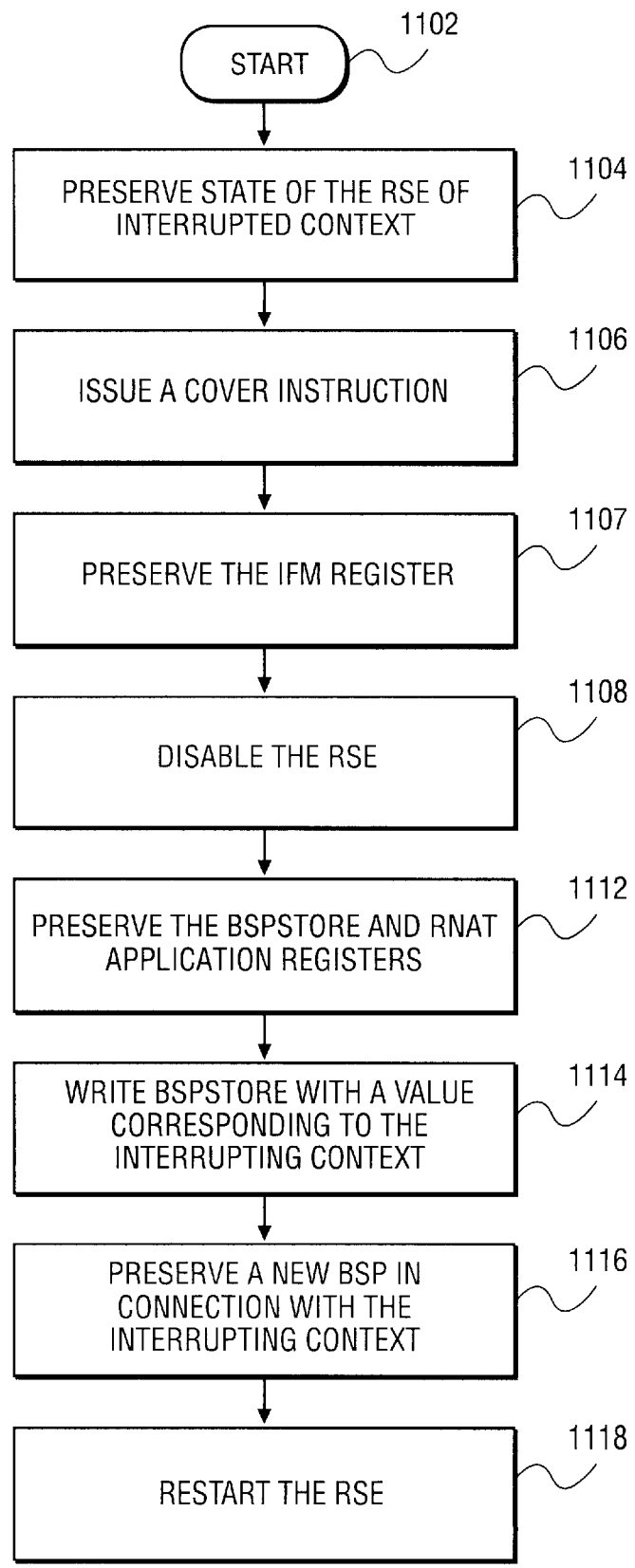
FIG. 11 illustrates a flow chart diagram in connection with a process for asynchronous switching a backing store from an interrupted context, the process utilizing the COVER instruction.

The present invention further provides a process for switching a backing store from an interrupted context and a process for returning from an interrupting context to an interrupted context. The first process uses the above-discussed COVER instruction while the second process uses the above-discussed LOADRS instruction. The first process may be implemented as a code sequence that may be used when an operating system has interrupted the program (user level or kernel level) and needs to take control over the register stack (RS) and over the register stack engine (RSE). In FIG. 11, the process starts at step 1102 and flows to step 1104 where a state of the RSE in connection with the interrupted context is preserved. This may be implemented by reading and saving the RSC and PFM application registers. The register stack configuration register (RSC) controls the operation of the RSC that includes mode bits that determine the mode of operation of the RSE such as eager RSE, lazy RSE, etc. The PFM register is a register that saves the content of the CFM register on a call from a procedure. At step 1106, a cover instruction is issued to cover the interrupted frame. The cover instruction causes the contents of the CFM to be saved to the IFM and setting of the IFM VALID bit. The cover instruction also causes the RSE to exchange information between both the first and second portions of the RS (current frame and dirty partition and the backing store). The COVER instruction also causes setting the size of the CFM to zero. In this way, the current frame of the RS in connection with the interrupted context is made accessible to the RSE.

At step 1107, the IFM register is read and saved (preserved). The process then passes to step 1108 where the RSE is disabled. RSE is disabled by setting the mode of the RSE in the RSC register in a lazy mode. At step 1112, BSPSTORE and RNAT application registers are preserved by reading and saving these registers. At step 1114, the BSPSTORE is written with a value corresponding to the interrupting context, i.e., with a value where the RSE in connection with the interrupting context, is configured to write a next register from the RS in connection with the interrupting context. At step 1116, a new BSP in connection with the interrupting context is preserved by reading and saving BSP so that a number of dirty registers plus intervening NAT collections may be calculated by subtracting the BSPSTORE value preserved at step 114 from the BSP preserved at step 116. Finally, at step 1118, the RSE is restarted by setting the mode, privilege level and byte order in the RSC.

Figure 12:
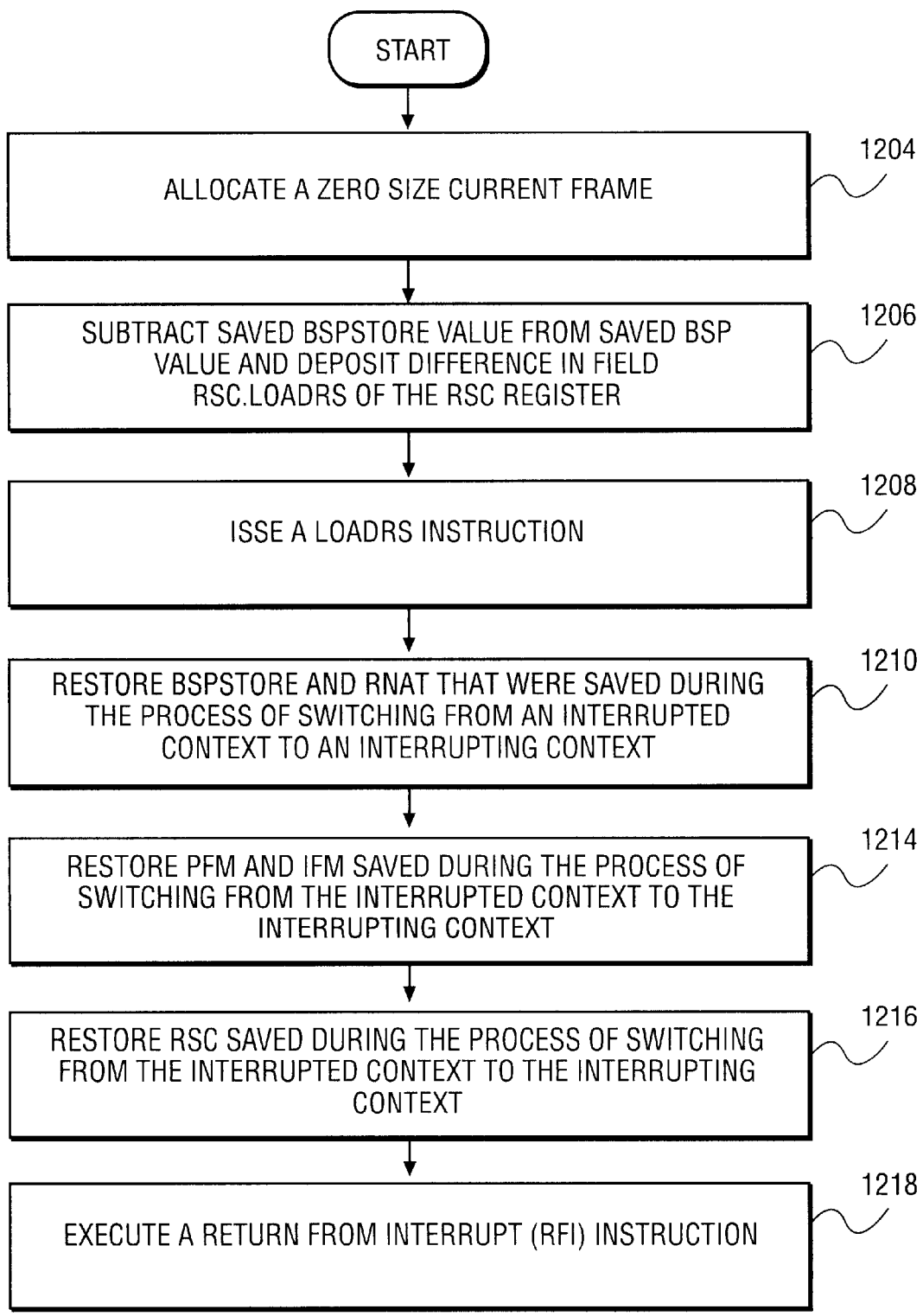
FIG. 12 illustrates a flow chart diagram in connection with a process for returning from an interrupting context to an asynchronously interrupted context, the process utilizing the LOADRS instruction.

FIG. 12 illustrates a code sequence that is used to return to an interrupted context from an interrupting context, after the code sequence described in connection with the flowchart of FIG. 11 was utilized to switch from the interrupted context to the interrupting context. This code sequence, illustrated in FIG. 12, utilizes the LOADRS instruction discussed above. Process 1200 starts at block 1202 from where it flows to block 1204. At block 1204, a zero size current frame is allocated. A zero size frame is allocated because in the first code sequence, for switching from the interrupted context of the interrupting context, a COVER instruction was issued. The COVER instruction caused RSE to access not just the dirty registers of the RS, but also the current frame portion. On return to the interrupted context, upon the execution of a LOADRS instruction, certain registers of the current frame that are not in the current frame upon return to the interrupted context may be loaded back to the current frame. The process then flows to block 1206 where the BSPSTORE value written during the first process at step 1114 is subtracted from the BSP value that was preserved during process 1100 preserved at step 1116. The difference is deposited in a field RSC.loadrs. At block 1208, a LOADRS instruction is issued to insure that registers from the interrupted context which were saved on the new backing store (related to the interrupting context) are loaded back into the register stack. At block 1210, the BSPSTORE and RNAT, saved at block 1112 of process 1100 are restored. At block 1214, the PFM and the IFM in connection with the interrupted context are also restored. At block 1216, the RSC preserved during process 1100 is restored. This restores the setting of the RSC enable bit as well as the RSC privilege level and byte order. At step 1218, a return from interrupt instruction is executed. The return from interrupt instruction determines whether the context of the IFM.VALID bit is valid, and, if so, the CFM is restored from the IFM.

Figure 13:
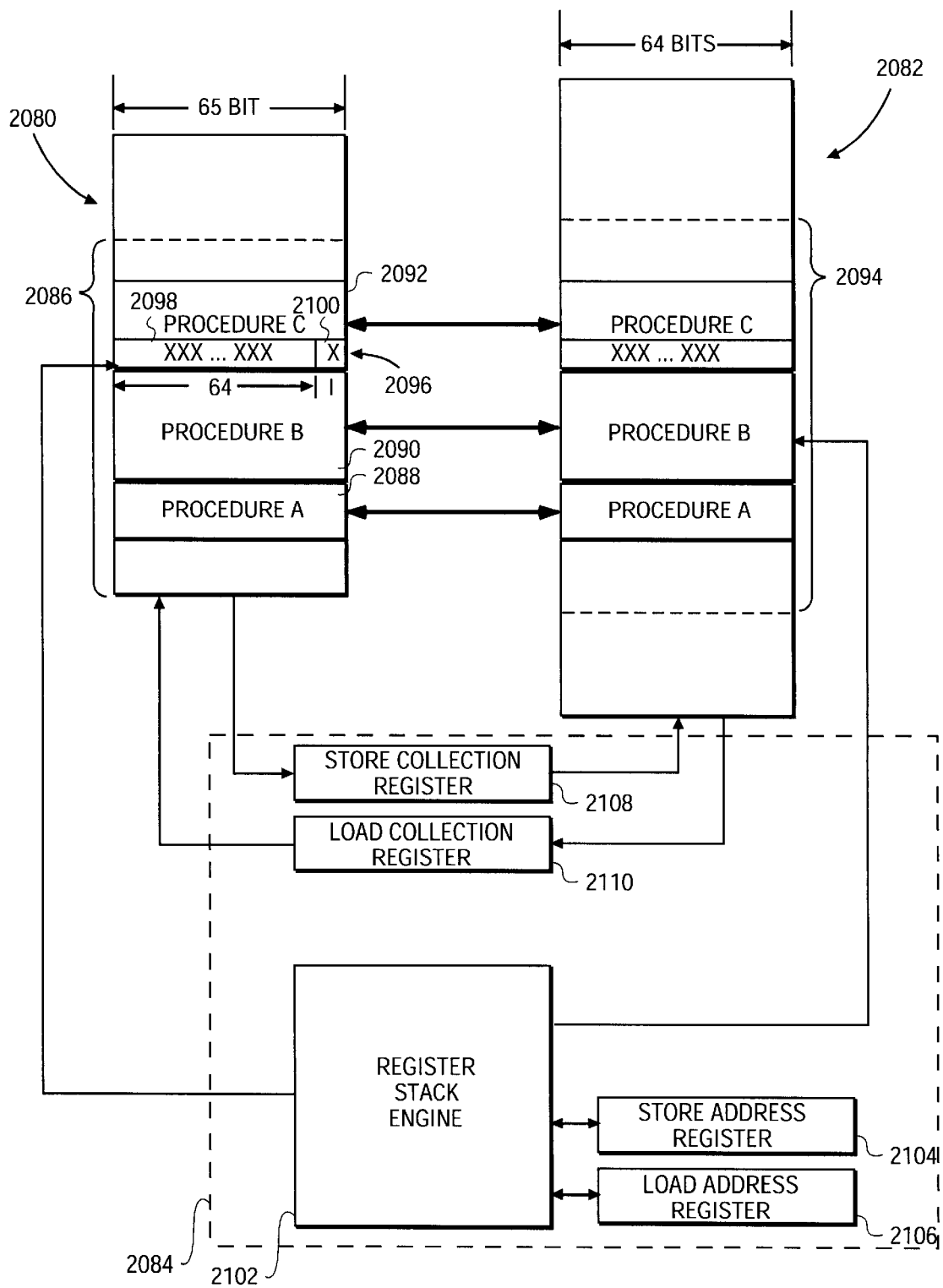
FIG. 13 is a schematic representation of apparatus, according to one embodiment of the invention, for transferring data between a register stack and a memory resource.

FIG. 13 is a diagrammatic representation of a set of general registers 2080, a main memory 2082, and transfer apparatus 2084, according to one exemplary embodiment of the invention, for facilitating the transfer of information between general registers 2080 and main memory 2082.

Register Stack and Backing Store

Of the general registers 2080, a subset thereof is designated for use as a register stack 2086. For example, of 128 general registers, 96 of them may be designated as comprising the register stack 2086. As an application program is executing, each procedure thereof may allocate a certain number of registers in the register stack 2086 as a local stack frame. Referring to FIG. 13, the stack register 2086 is accordingly shown to include stack frames 2088, 2090 and 2092, associated with procedures A, B and C respectively. Each of the stack frames 2088, 2090 and 2092 comprises a predetermined number of registers having a specific bit-length. In the embodiment illustrated in FIG. 13, each register in the register stack has bit-length of 65 bits.

Each stack frame is automatically preserved as another procedure is called. For example, the stack frame 2088 for procedure A is preserved when procedure A calls procedure B. Similarly, the stack frame 2090 for procedure B is preserved in the register stack when procedure B calls procedure C. When a return from procedure occurs, the relevant stack frame is then removed from the register stack. For example, on a return from procedure C to procedure B, the stack frame 2092 is removed from the register stack 2086.

It will be appreciated that the register stack 2086 is of a fixed and limited capacity. In the event of a large number of consecutively called procedures, the register stack 2086 may have insufficient capacity to accommodate stack frames for all called procedures, and the register stack may overflow or "spill". Specifically, the number of on-chip physical registers assigned to the storage of stack frames is statically determined per implementation. Dynamically, if a current stack frame attempts to grow such that the current stack frame plus previously stored stack frames (that have not been spilled) exceeds the capacity of the on-chip unused registers, then an overflow is detected. In this situation, it becomes necessary to save some of the older stack frames (or "dirty" stack frames) to a section of main memory 2082 designated as a backing store 2094. In the event of the procedure call stack in the register stack 2086 becoming too deep, it may thus become necessary to save some of the stack frames 2088, 2090 and 2092 to the backing store 2094, as illustrated in FIG. 13.

Similarly, as stack frames for procedures subsequent to procedures A, B and C are removed from the register stack 2086, it again becomes desirable for the stack frames 2088, 2090 and 2092 to reside in the register stack 2086. Accordingly, when capacity becomes available in the register stack 2086, portions of the stack frames 2088, 2090 and 2092 can then again be incrementally transferred from the backing store 2094 to the register stack 2086. Other situations, such as the process of flushing a register stack, in which the transfer of stack frames from the register stack 2086 to a backing store 2094 may be required, are described above. However, in one embodiment, the storing of attribute bits, it in the manner described above, within the store collection register 2108 is only performed in the above mentioned the "eager mode", and not during a flushing operation.

Attribute Information

In advanced processor architectures, it may be desirable to associate attribute information with certain data. For example, in processors capable of speculative instruction execution, it may be desirable to defer exceptions generated by such speculative instructions until the relevant instruction becomes non-speculative. In order to implement this deferred handling of exceptions generated by speculatively-executed instructions, the embodiment of the invention illustrated in FIG. 13 shows each 64-bit general register 2080 to be augmented with a 65th bit termed an attribute bit. In one embodiment, this attribute bit is termed a "Not-a-Thing" (NAT) bit. An exemplary register 2096 is thus shown to include (64) data bits 2098 and a single attribute bit 2100. The attribute bit 2100 is used to indicate the success or failure of a series of speculative load operations targeting the relevant register. If the load instruction to a particular memory address would have generated a fault, a speculative load instruction will set the attribute bit 2100, associated with the target register, to a logical one (1). In this way, handling of the fault is deferred until a program attempts, if ever, to use the result of the load operation. Accordingly, compilers are able to issue load instructions earlier than would otherwise have been possible.

The creation of a general register having a 65-bit length, while being advantageous from an exception handling view point, may give rise to certain inefficiencies in the saving of data from the register stack 2086 to the backing store 2094. As main memory 2082 is addressed in terms of 8-bit bytes, one method of storing the contents of a register to the backing store 2094 proposes using 9 bytes for the storage of each general register. However, this would result in a waste of seven bits per register, as the Most Significant Bit (MSB) would be the only bit occupying the final 9th byte transferred to the main memory 2082. This inefficiency is exasperated when memory is addressed in terms of 16-bit half-words.

Referring specifically to FIG. 13, the transfer apparatus 2084 comprises a register stack engine 2102, a pair of address registers 2104 and 2106, and a pair of collection registers 2108 and 2110. As described below, the register stack engine 2102 is responsible for transferring stack frames from the register stack 2086 to the backing store 2094 (spills), and also for transferring stack frames back from the backing store 2094 to the register stack 2086 (fills). The register stack engine 2102 may spill and fill the register stack 2086 without explicit program intervention, and concurrently and asynchronously with respect to instruction execution. This allows the register stack engine 2102 to take advantage of unused memory band-width to dynamically perform register spill and fill operations in a preemptive manner. For example, the register stack engine 2102 can preempt a register stack 2086 overflow by transferring stack frames to the backing store 2094 when it anticipates a register stack overflow may occur. Similarly, the register stack engine 2102 may preemptively transfer stack frames from the backing store 2094 to the register stack 2086 prior to the stack frame actually being required. By performing these spill and fill operations in an asynchronous manner, and using spare memory cycles, processor performance is enhanced.

Alternatively, the register stack engine 2102 may transfer frames between the register stack 2086 and the backing store 2094 in response to a specific instruction, such as the FLUSHRS instruction described above.

The register stack engine 2102 is coupled to the store and load address registers 2104 and 2106. The store address register 2104 is a 64-bit register, and contains the address of the location in the backing store 2094 into which the next 64-bit value, retrieved from the register stack 2086, will be saved. The store address register 2104 is used by the register stack engine 2102 when saving general registers, and the address contained therein may be required to be 8-byte aligned. This register 2106 may, in one exemplary embodiment, comprise the BPSTORE application register described above. Similarly, the load address register 2106 is a 64-bit register, and contains the address of the location (8 bytes deeper) in the backing store 2094 from which the next 64-bit value will be retrieved for transfer back to the register stack 2086. This address may similarly be required to be 8-byte aligned. This register 2106 may, in one exemplary embodiment, comprise the BSPLOAD application register described above.

The store and load collection registers 2108 and 2110 are dedicated to the temporary storage of attribute bits 2100 when data associated with these attribute bits is transferred between the register stack 2086 and the backing store 94. The collection registers 2108 and 2110 may, in one exemplary embodiment, comprise a single register in the form of the RNAT application register described above. The operation of these storage registers 2108 and 2110 will be described below with reference to FIGS. 14 and 15. Each of the collection registers 2108 and 2110 is a 64-bit register. The store collection register 2108 contains the attribute bits 2100 of up to 63 of the registers most recently saved to the backing store 2094. Similarly, the load collection register 2110 contains the attribute bits 2100 of up to 63 of the next registers to be restored.

Methodology

Figure 14:
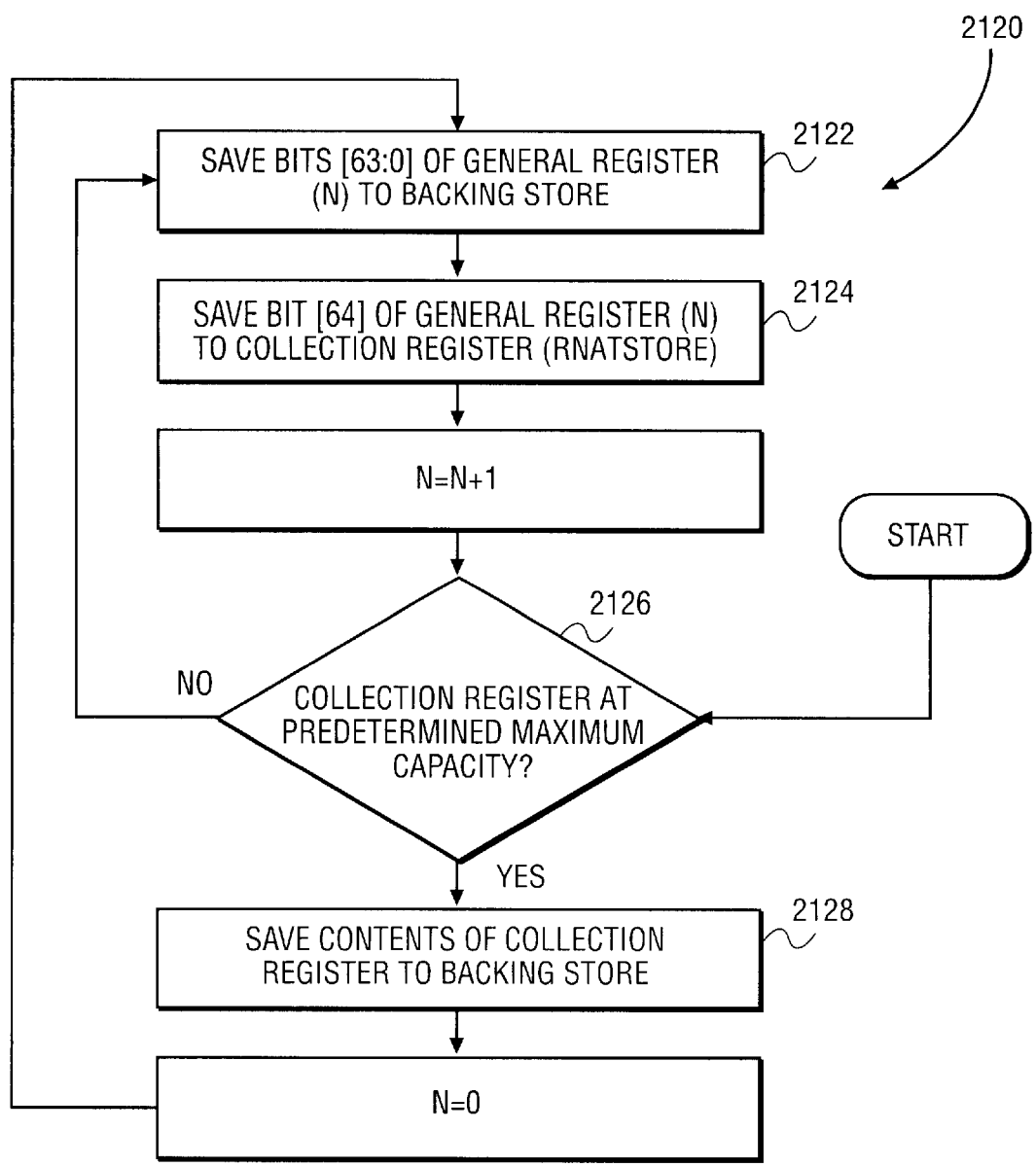
FIG. 14 is a flow chart illustrating a method, according to the present invention, of storing the contents of a register in a memory resource.

Methods by which data is transferred between the register stack 2086 and the backing store 2094, as performed by the transfer apparatus 2084, will now be described with reference to the flow charts shown in FIGS. 14 and 15. A method 2120 of storing the contents of a general register 2096 to a designated location in the backing store 2094, according to one exemplary embodiment of the invention, is illustrated in FIG. 14.

In summary, the exemplary method 2120 saves general registers to the backing store 2094 in groups of sixty-three registers, and concurrently collects the attribute bits 2100 for each these registers in the store collection register 2108. It will be appreciated that the invention is not limited to groups of sixty-three registers, and register groups of any size could be transferred. After each group of sixty-three general registers has been transferred to the backing store 2094, the method 2120 then saves the collection of attribute bits 2100, now contained in the register 2108, to the backing store 2094 as a 64-bit doubleword. More specifically, the method 2120 commences at step 2122 by saving bits [64:1] (i.e., data bits 2098) of a general register N to the next available 64-bit location in the backing store 2094. At step 2124, bit [0] (i.e., attribute bit 2100) of the general register N is saved to the next available location in the store collection register 2108. At decision box 2126, a determination is made as to whether the collection register 2108 has reached a predetermined maximum capacity. In the illustrated embodiment, a determination is made as to whether the collection register 2108 contains 63 attribute bits. If the collection register 2108 has not reached the predetermined capacity, then steps 2122 and 2124 are performed with respect to the sequentially next general register in the register stack 2086. Alternatively, should the maximum capacity of the collection register 2108 have been reached, the method 2120 proceeds to step 2128, and the contents of the store collection register 2108 are saved at the next available 64-bit location in the backing store 2094. The contents of the store collection register 2108 now having been emptied, the method 2120 is repeated with respect to the next group of sixty-three general registers in the register stack 2086.

The determination at step 2126 as to whether the store collection register 2108 contains the predetermined number of attributes 2100 may be performed in a number of different ways. In one embodiment, a simple counter (not shown) may be provided which maintains a count of the number of register transfers between the register stack 2086 and the backing store 2094 since the later of: (i) the last time the store collection register 2108 has been stored to the backing store and (ii) a reset. In another embodiment, the register stack engine 2102 may simply examine a specific sequence of bits of the address contained in the store address register 2104. In the illustrated embodiment, bits [8:3] of the store address register 2104 (e.g., the BSPSTORE application register) provide a count of the number of register transfers from the register stack 86 to the backing store 2094 since the later of: (i) the last time the store collection register 2108 has been stored to the backing store 2094 and (ii) a reset. Accordingly, should the bits [8:3] in the store address register 2104 not be all one's (1's), this indicates that the store collection register 2108 has not reached its predetermined capacity, and that steps 2122 and 2124 should be performed with respect to the next sequential general register. On the other hand, should the bits [8:3] of the stored address register 2104 be all one's (1's), this indicates that sixty-three attribute bits 2100 have been saved to the store collection register 2108, and that step 2128 should be performed.

Figure 16:
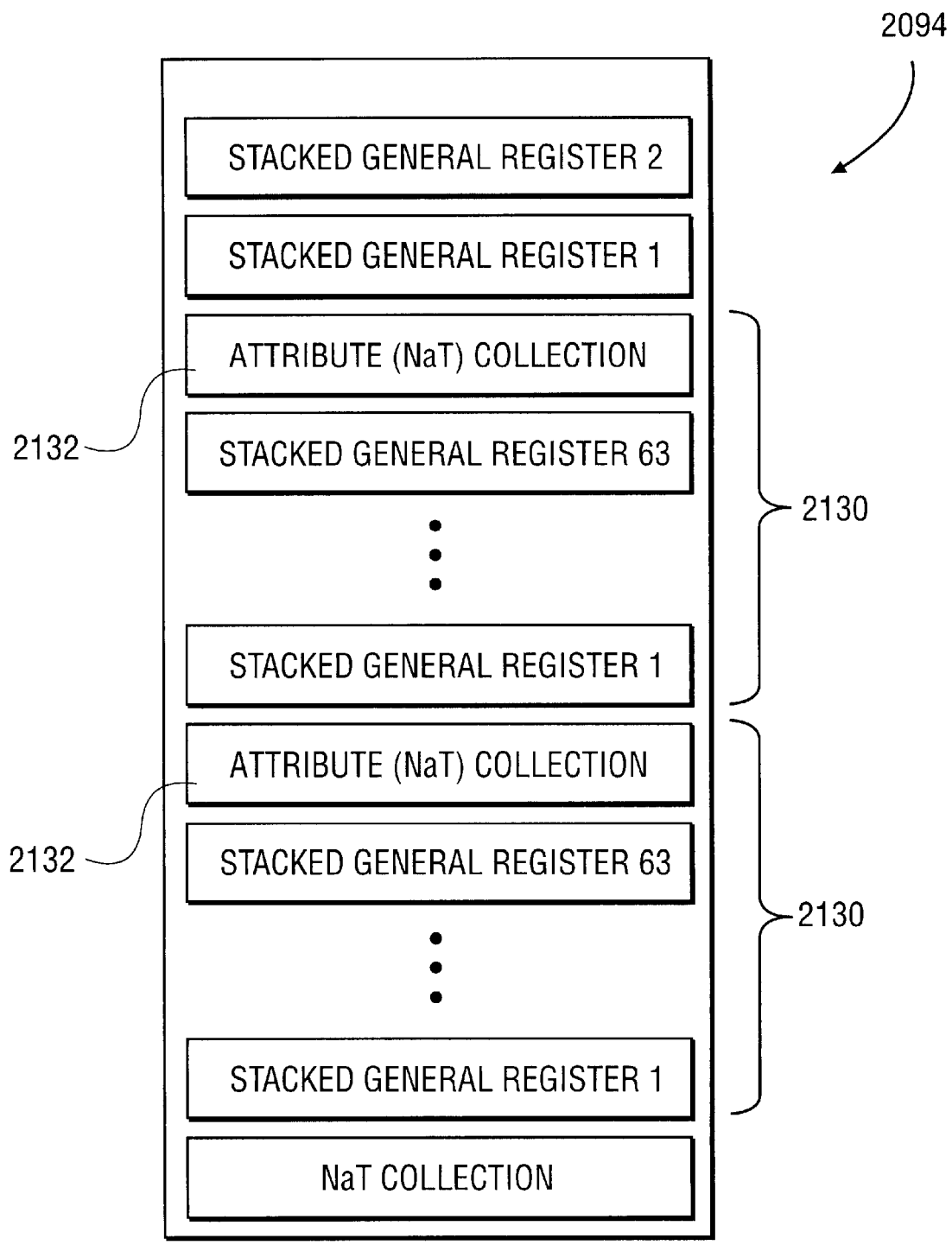
FIG. 16 is a schematic representation of a backing store, according to the present invention, as constructed in main memory.

FIG. 16 shows a more detailed view of the backing store 2094, and provides an illustrative example of how batches 2130 of data are stored to main memory 2082. Each batch 2130 is shown to comprise the contents of a group of sixty-three general registers followed by an assembled attribute bit (or NAT bit) collection 2132 comprising the attribute bits associated with the preceding general register content.

Figure 15:
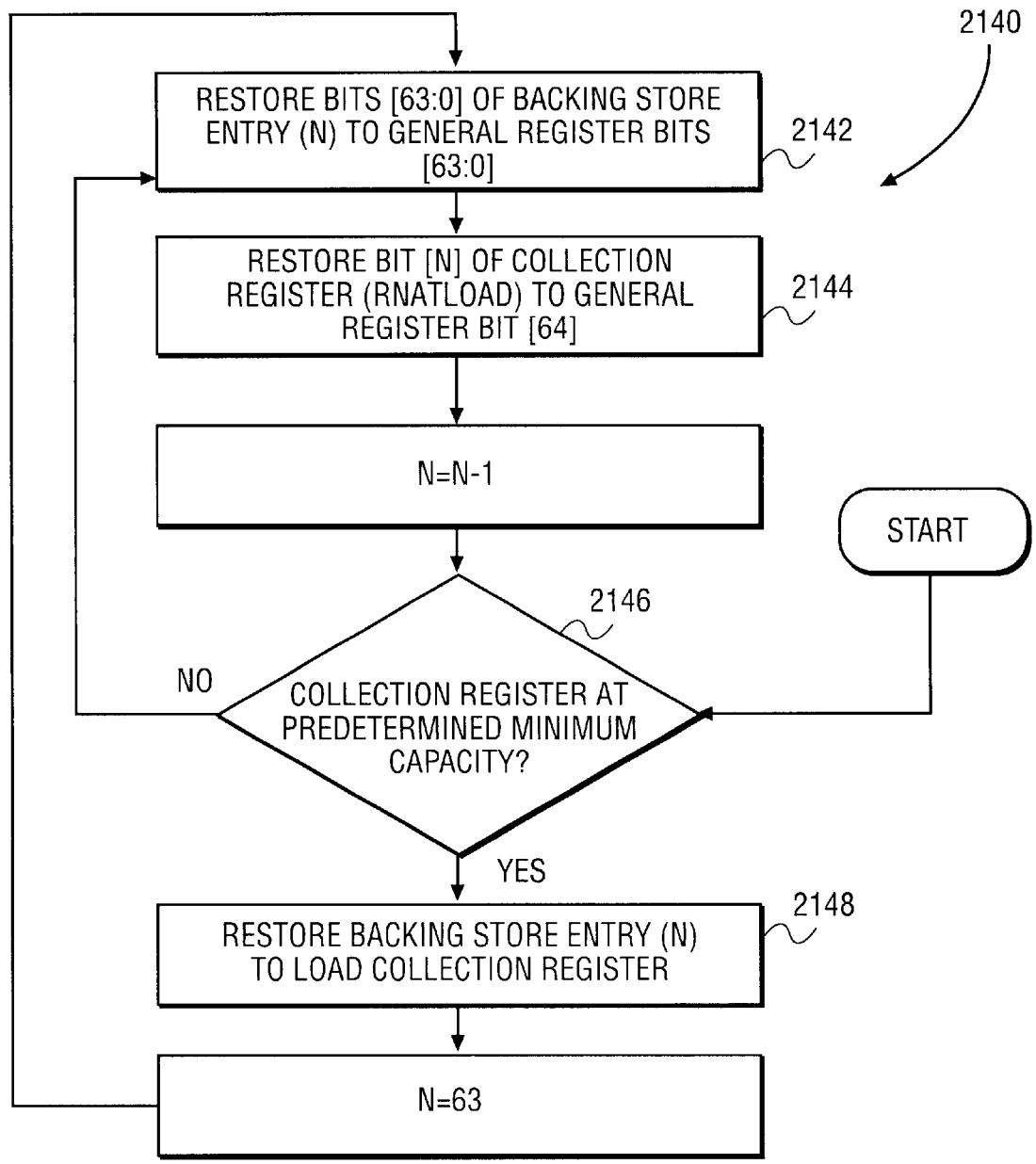
FIG. 15 is a flow chart illustrating a method, according to the invention, of restoring the contents of a register from a memory resource.

Referring now to FIG. 15, there is shown a flow chart illustrating a method 2140, according to one embodiment of the present invention, of restoring the contents of a series of general registers 2086 from the backing store 2094 in the main memory 2082. Each 64-bit double word stored in the backing store 2082 may conveniently be termed a "data block". In essence, the method 2140 comprises loading an attribute bit collection 2132, having a bit-length of 64 bits, from a location in the backing store 2094 into the load collection register 2110. Thereafter, each data block, stored in the backing store 2094, is paired with an associated attribute bit, now contained in the load collection register 2110. In one embodiment, the pairing of a data block and an associated attribute bit occurs within a target general register. In an alternate embodiment, the pair may occur outside the general register (e.g., in an intermediate register, whereafter the resulting 65-bit data and attribute assembly is transferred to the next available general register 2096 in the register stack 2086. This procedure is performed with respect to each data block, stored in the backing store, associated with an attribute bit stored in the load collection register 2110. On completion of the return of the contents to the sixty-three general registers, the load collection register 2110 is loaded with the attribute bits for the next sixty-three data blocks stored in the backing store 2082, and the above procedure is repeated. Referring now specifically to FIG. 15, the method 2140 commences at 2142 by storing bits [63:0] of a backing store entry (N) (i.e., a data block) to bits [64:1] of the next 65-bit general register 2096. At step 2144, bit (N) (i.e., the attribute bit associated with the bits [63:0]) is saved to bit [0] of the same general register 2096 to which the save was made at step 2142. Accordingly, the sixty-four data bits 2098 and the single attribute 2100 are again assembled in a general register.

At decision block 2146, a determination is made as to whether all attribute bits stored in the load collection register 2110 have been loaded into appropriate general registers. If not, the method returns to step 142 and the contents of the next sequential register are restored from the backing store 2094 and the load collection register 2110 as described above. On the other hand, should it be determined at decision block 2146 that the load collection register 2110 has been exhausted, the register 2110 is then again filled, at step 2148, with the attribute bit collection 2132 for the next sixty-three general registers to be restored. As a result of the way in which data was saved to the backing store 2094 by the method 2100 of FIG. 14, the required attribute collection 2132 is saved as the next 64-bit memory location in the backing store 94.

The determination at decision block 2146 as to whether the load collection register is exhausted may be performed by reference to a simple counter, which maintains a count of the number of transfers between the backing store and the register stack. In the embodiment of the invention illustrated in FIG. 13, bits [8:3] of the load address register 2106 provide a count of the number of transfers that have occurred from the backing store to the register stack. Accordingly, by referencing these bits [8:3], the register stack engine 2102 is able to determine if the load collection register 2110 has been exhausted. Specifically, if bits [8:3] of the load address register 2106 are not all one's (1's), this indicates that the load collection register 2110 has not been exhausted. Alternatively, should bits [8:3] be all one's (1's), the double word (i.e., the 64-bit attribute collection 2132) at the location designated by the address in the load address register 2106 is loaded from the backing store 2094 into the load collection register 2110. In this way, the attribute bits for the next group sixty-three registers to be restored are available in the register 2110.

Architectural Visibility and Context Switching

Figure 17:
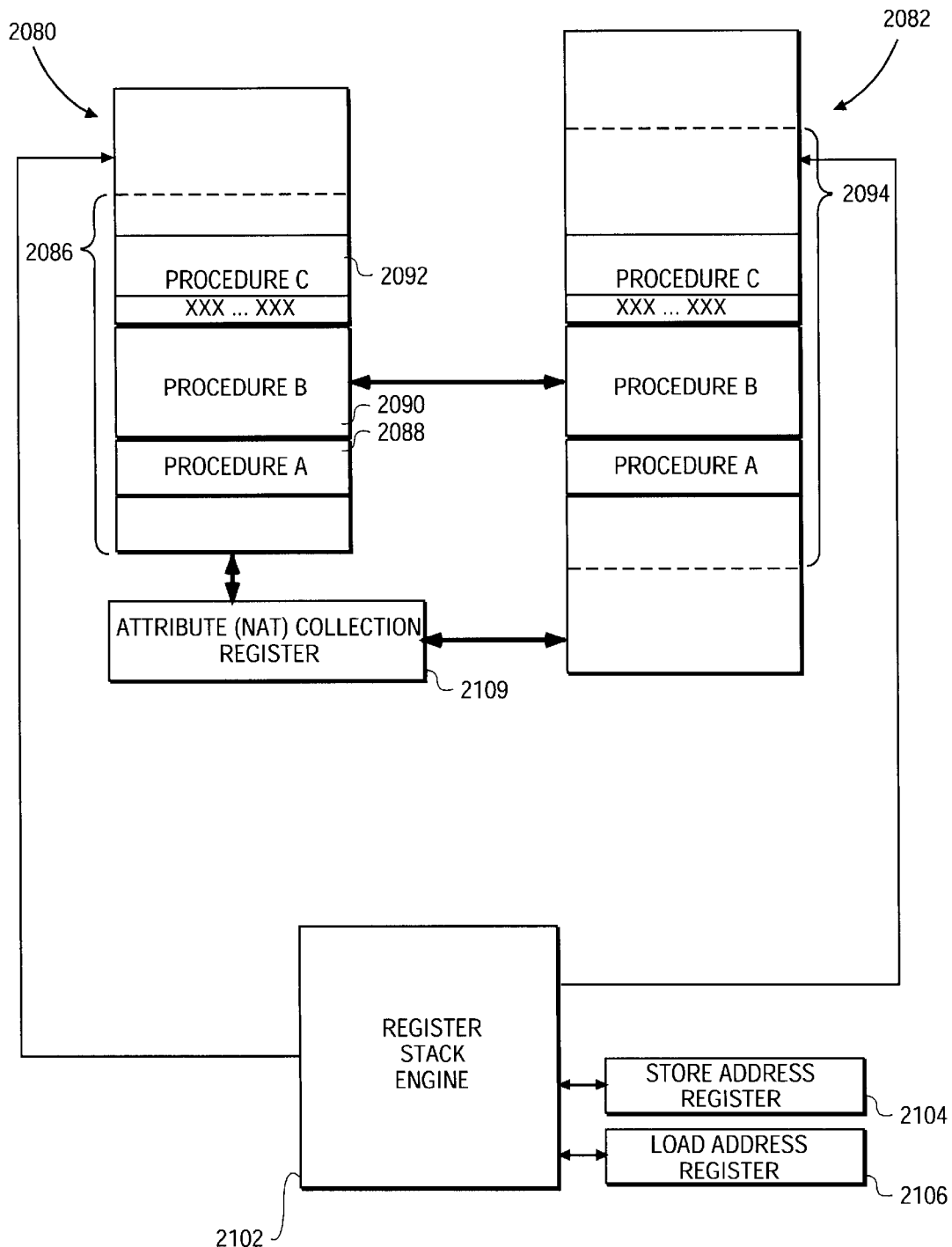
FIG. 17 is a schematic representation of an apparatus, according to a further embodiment of the present invention, for transferring data between a register stack and a memory resource.

Referring to FIG. 17, there is illustrated an architectural view of the hardware shown in FIG. 13. Specifically, the store collection register 2108 and the load collection register 2110 are shown to be architecturally defined as a single attribute collection register 2109. Physically, however, the architecturally defined attribute collection register 2109 may comprise multiple collection and distribution registers due to the fact that the distances between the addresses indicated in the store address register 2104 and the load address register 2106 (as dictated by the number of general registers allocated for use as the register stack) may be too large to make a single, or even a pair of, collection and distribution registers sufficient. For example, where the number of stack registers is less than 63, a pair of 64-bit registers may be sufficient to constitute the attribute collection register 2109. However, where the number of stacked registers is 945, then 16 64-bit registers may be required for the attribute collection register 2109.

Hardware may choose to implement fewer registers, as long as the semantics of the architectural description are preserved. Implementing a smaller number of registers within the attribute collection register 2109 may hinder the association of the register 2109 to a particular backing store range, and it may also negatively impact the management of the validity of the register's content. These complications can, however, the avoided when the number of registers is a power of 2, and is indexed by a portion of the backing store address.

In alternative embodiments of the present invention, the registers that comprise the attribute collection register 2109 may be architecturally visible or architecturally invisible. Where the attribute collection register 2109 is not architecturally visible, the register stack engine 2102 manages the attribute bits spill and fill operations. Specifically, flushing the register stack to the backing store 2094 in the memory 2082 requires that the last attribute bit collection, as stored in the attribute collection register 2109, be spilled by the register stack engine 2102 to the backing store 2094.

Alternatively, where the attribute collection register 2109 is architecturally visible, the operating system explicitly saves and restores the attribute bit collection to and from the attribute collection register 2109 after a flush (for example, in response to the FLUSHRS instruction). More specifically, when a software program performs a context switch, it may often occur that the register stack engine 2102 may not have saved a full group of 63 registers from the register stack 2086 to the backing store 2094. In this case, a partial collection of attributes bits may thus be residing in the attribute collection register 2109, these attribute bits corresponding to the less than 63 saved general registers. The operating system is responsible for saving the content of the attribute collection register 2109 when saving the context of a process, and must similarly prime the attribute collection register 2109 when restoring the context of a process. The operating system may, in one embodiment, save the partially complete content of the attribute collection register 2109 to the next available location in the backing store 2094 as indicated by the address in the store address register 2104. Similarly, the partially complete content of the attribute collection register 2109 may be restored from the next available location in the backing store 2094, as indicated by the address stored in the load address register 2106, upon restoration of a context Accordingly, the logic or intelligence for handling the storing of the contents of the attribute collection register 2109 to memory 2082, and for restoring the contents of the attribute collection register 2109 from memory 2082 on the concurrence of a context switch may reside in hardware within the register stack engine 2102 (in which case the attribute collection register 210 is architecturally invisible), or may reside within software (e.g., within the operating system) in which case the attribute collection register 2109 is architecturally visible.

Thus, a method and apparatus for transferring data between a register and a memory resource have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of transferring data between a register and a memory resource, the method including the steps of:

transferring a first portion of data stored in a first register to a first location;

transferring a second portion of the data stored in the first register to a second location;

determining whether the second location contains a predetermined quantity of stored data; and if the second location contains the predetermined quantity of stored data, then transferring the stored data from the second location to a third location.

2. The method of claim 1 wherein, if the second location does not contain the predetermined quantity of stored data, then transferring a first portion of data stored in a second register to the first location, and transferring a second portion of the data stored the second register to the second location.

3. The method of claim 1 wherein the first register is an on-chip register of an integrated circuit and the first location is an off-chip memory resource.

4. The method of claim 1 wherein the first register comprises a general purpose register of a register stack.

5. The method of claim 1 wherein the second location is a collection register.

6. The method of claim 5 wherein the collection register is an on-chip register of an integrated circuit.

7. The method of claim 1 wherein the first and second portions comprise N and M bits respectively of the data stored in the first register.

8. The method of claim 1 wherein the first register has a size of N+M bits, the first location has a size of N bits, and the predetermined quantity of stored data comprises N bits.

9. The method of claim 7 wherein N+M comprises an odd number.

10. The method of claim 7 wherein the M bits comprise attribute information concerning the N bits.

11. The method of claim 10 wherein the attribute information indicates whether data comprising the N bits is valid or invalid.

12. The method of claim 1 including the steps of:

detecting a context switch; and in response to the detection of the context switch, transferring the stored data from the second location to a fourth location.

13. The method of claim 12 wherein the transfer of the stored data to the fourth location is performed under the direction of a register stack engine.

14. The method of claim 12 wherein the transfer of the stored data to the fourth location is performed under the direction of an operating system.

15. A method of restoring content to a register from a memory resource, the method including the steps of:

transferring a first portion of the content from a first location within a memory resource to a first register;

transferring a second portion of the content from a second location to the first register;

determining whether a predetermined quantity of content from the second location has been transferred to registers; and if so, then transferring content of a third location of the memory resource to the second location.

16. The method of claim 15 wherein, if a predetermined quantity of content has not been transferred from the second location to the registers, then transferring a first portion of content from the third location in the memory resource to a second register, and transferring a second portion of content from the second location to the second register.

17. The method of claim 15 wherein the second location is a collection register.

18. The method of claim 17 wherein the collection register is an on-chip register of an integrated circuit.

19. The method of claim 15 wherein the first and second portions comprise N and M bits respectively of the content.

20. The method of claim 19 wherein the first register has a capacity of N+M bits, the first location within the memory resource has a capacity of N bits, and the predetermined quantity of content comprises N bits.

21. The method of claim 15 wherein the first and third locations are sequential locations in the memory resource.

22. The method of claim 15 wherein the first register comprises a general purpose register of a register stack, and the memory resource comprise a main memory associated with an integrated circuit.

23. The method of claim 19 wherein the M bits comprise attribute information concerning the N bits.

24. The method of claim 15 including the steps of:

detecting a context switch; and in response to the detection of the context switch, transferring the content from the fourth location to the second location.

25. The method of claim 24 wherein the transfer of the content from the fourth location to the second location is performed under the direction of a register stack engine.

26. The method of claim 24 wherein the transfer of the content from the fourth location to the second location is performed under the direction of an operating system.

27. Apparatus for transferring content between a register stack and a memory resource, the apparatus comprising:

a temporary storage facility; and transfer logic to transfer a first portion of content of a first register in the register stack to a first location in the memory resource, to transfer a second portion of the content of the first register to a second location in the temporary storage facility and to transfer content of the second location to a third location in the memory resource after a predetermined number of transfers between the register stack and the memory resource.

28. The apparatus of claim 27 including a counter for maintaining a count of the number of transfers from the register stack to the memory resource.

29. The apparatus of claim 28 wherein the counter comprises an address register indexing a location in the memory resource.

30. The apparatus of claim 27 wherein the first register in the register stack has a bit length of N+M and the first location in the memory resource has a bit length of N bits.

31. The apparatus of claim 30 wherein N+M is an odd number.

32. The apparatus of claim 27 wherein the transfer logic is configured, if a predetermined number of transfers between the registers stack and the memory resource has not occurred, to transfer a first portion of the content of a second register in the register stack to the third location in the memory resource and to transfer a second portion of the content of the second register to the second location.

33. The apparatus of claim 27 wherein the first and third locations in the memory resource are consecutive storage locations.

34. The apparatus of claim 27 wherein the second portion of the content comprises attribute information concerning the first portion.

35. Apparatus for transferring content between a memory resource and a register stack, the apparatus comprising:
   a temporary storage facility; and
   transfer logic to transfer a first portion of content from a first location in the memory resource, and a second portion of content from a second location in the temporary storage facility, to a first register in the register stack, and to transfer the content of a third location in the memory resource to the second location after a predetermined number of data transfers between the register stack and the memory resource.

36. The apparatus of claim 35 including a counter for maintaining a count of the number of transfers between the register stack and the memory resource.

37. The apparatus of claim 36 wherein the counter comprises an address register indexing a location in the memory resource.

38. The apparatus of claim 35 wherein the first register in the register stack has a bit length of N+M bits and the first location in the memory resource has a bit of N bits.

39. The apparatus of claim 38 wherein N+M is an odd number.

40. The apparatus of claim 35 wherein the transfer logic is configured, if a predetermined number of data transfers between the registers stack and the memory resource has not occurred, to transfer a first portion of content from the third location in the memory resource, and a second portion of content from a fourth location in the temporary storage facility, to a second register in the register stack.

41. A processor comprising:
   a register stack including a first register;
   a temporary storage register; and
   a register stack engine to transfer a first portion of content of the first register of the register stack to a first location in a memory resource accessible by the processor, to transfer a second portion of content of the first register to a second location in the temporary storage register, and to transfer the content of the second location in the temporary storage register to a third location in the memory resource after a predetermined number of transfers have occurred between the register stack and the memory resource.

42. A processor comprising:
   a register stack including a first register;
   a temporary storage register; and
   a register stack engine to transfer a first portion of content from a first location in a memory resource accessible by the processor, and a second portion of content from a second location in the temporary storage register, to the first register of the register stack, and to transfer content of a third location in the memory resource to the second location in the temporary storage register after a predetermined number of data transfers have occurred between the register stack and the memory resource.

43. A computer system comprising:
   a memory resource; and
   a processor coupled to access the memory resource, the processor further including:
      a register stack including a first register;
      a temporary storage register; and
      a register stack engine to transfer a first portion of content of the first register of the register stack to a first location in a memory resource accessible by the processor, to transfer a second portion of content of the first register to a second location in the temporary storage register, and to transfer the content of the second location in the temporary storage register to a third location in the memory resource after a predetermined number of transfers have occurred between the register stack and the memory resource.

44. A computer system comprising:
   a memory resource; and
   a processor coupled to access the memory resource, the processor further including:
      a register stack including a first register;
      a temporary storage register; and
      a register stack engine to transfer a first portion of content from a first location in a memory resource accessible by the processor, and a second portion of content from a second location in the temporary storage register, to the first register of the register stack, and to transfer content of a third location in the memory resource to the second location in the temporary storage register after a predetermined number of transfers have occurred between the register stack and the memory resource.

45. A processor comprising:
   a first storage means;
   a temporary storage means; and
   a transfer means for transferring a first portion of content of the first storage means to a first location in a memory resource accessible by the processor, for transferring a second portion of content of the storage means to a second location in the temporary storage means, and for transferring the content of the second location in the temporary storage means to a third location in the memory resource after a predetermined number of transfers have occurred between the first storage means and the memory resource.

* * * * *